(12) United States Patent
Shikii et al.

(10) Patent No.: US 9,794,553 B2
(45) Date of Patent: Oct. 17, 2017

(54) IMAGE TRANSMITTING DEVICE TO ENHANCE SECURITY OF PARKED VEHICLE

(71) Applicant: Panasonic Intellectual Property Corporation of America, Torrance, CA (US)

(72) Inventors: Shinichi Shikii, Nara (JP); Motoji Ohmori, Osaka (JP); Koichi Kusukame, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 214 days.

(21) Appl. No.: 14/416,069

(22) PCT Filed: Apr. 22, 2014

(86) PCT No.: PCT/JP2014/002257
§ 371 (c)(1),
(2) Date: Jan. 21, 2015

(87) PCT Pub. No.: WO2014/188661
PCT Pub. Date: Nov. 27, 2014

(65) Prior Publication Data
US 2015/0195518 A1      Jul. 9, 2015

Related U.S. Application Data

(60) Provisional application No. 61/827,109, filed on May 24, 2013.

(51) Int. Cl.
| | | |
|---|---|---|
| *H04N 7/18* | (2006.01) | |
| *H04N 17/00* | (2006.01) | |
| *B60R 25/10* | (2013.01) | |
| *B60R 25/30* | (2013.01) | |

(Continued)

(52) U.S. Cl.
CPC .......... *H04N 17/004* (2013.01); *B60R 1/002* (2013.01); *B60R 25/1006* (2013.01);
(Continued)

(58) Field of Classification Search
CPC ..................................................... H04N 17/004
(Continued)

(56) References Cited

U.S. PATENT DOCUMENTS

| | | | |
|---|---|---|---|
| 7,667,580 B2 | 2/2010 | Tauchi et al. | |
| 2007/0040701 A1* | 2/2007 | Browne ................ | G08G 1/143 340/932.2 |

(Continued)

FOREIGN PATENT DOCUMENTS

| | | |
|---|---|---|
| JP | 2001-091280 | 4/2001 |
| JP | 2003-127835 | 5/2003 |

(Continued)

OTHER PUBLICATIONS

Extended European Search Report dated Oct. 10, 2016 in European Application No. 14801038.2.

(Continued)

*Primary Examiner* — Richard Torrente
(74) *Attorney, Agent, or Firm* — Winderoth, Lind & Ponack, L.L.P.

(57) ABSTRACT

In order to enhance security of a parked vehicle, an image transmitting device to be mounted on a vehicle includes: a checking unit that checks, at a parking place of the vehicle, communicability with an external device outside of the vehicle, that is, whether an image can be transmitted from the parking place to the external device; a providing unit that provides notification information based on a result of the checking by the checking unit; a capturing unit that captures (Continued)

an image while the vehicle is parked; and a transmitting unit that transmits the image captured by the capturing unit to the external device.

15 Claims, 21 Drawing Sheets

(51) Int. Cl.
*B60R 1/00* (2006.01)
*H04N 5/33* (2006.01)
*H04N 7/16* (2011.01)
*H04N 21/2187* (2011.01)
*H04N 21/414* (2011.01)
*H04N 21/472* (2011.01)
*G07C 5/00* (2006.01)

(52) U.S. Cl.
CPC ............ *B60R 25/305* (2013.01); *G07C 5/008* (2013.01); *H04N 5/33* (2013.01); *H04N 7/16* (2013.01); *H04N 7/185* (2013.01); *H04N 21/2187* (2013.01); *H04N 21/41407* (2013.01); *H04N 21/47202* (2013.01); *B60R 2300/8073* (2013.01)

(58) Field of Classification Search
USPC .......................................................... 348/148
See application file for complete search history.

(56) References Cited

U.S. PATENT DOCUMENTS

| 2007/0273489 | A1* | 11/2007 | Tauchi | .................... B60R 25/04 340/426.11 |
| 2012/0105635 | A1* | 5/2012 | Erhardt | ................. B60R 25/102 348/148 |
| 2014/0200038 | A1* | 7/2014 | Rao | ..................... H04L 67/2847 455/457 |

FOREIGN PATENT DOCUMENTS

| JP | 2005-033694 | 2/2005 |
| JP | 2005-339366 | 12/2005 |
| JP | 2005-340873 | 12/2005 |
| JP | 2006-117121 | 5/2006 |
| JP | 2007-199840 | 8/2007 |
| JP | 2007-310593 | 11/2007 |
| JP | 2010-113494 | 5/2010 |
| JP | 2013-041489 | 2/2013 |

OTHER PUBLICATIONS

International Search Report dated Jul. 29, 2014 in International (PCT) Application No. PCT/JP2014/002257.

* cited by examiner

IMAGE TRANSMITTING DEVICE TO ENHANCE SECURITY OF PARKED VEHICLE

TECHNICAL FIELD

The present invention relates to devices including a security camera or the like mounted on a vehicle such as an automobile, and particularly to an image transmitting device that transmits an image captured by a camera to the outside of a vehicle.

BACKGROUND ART

In the context of increasing awareness about security for automobile or the like, an in-vehicle security device including a camera has been proposed (see Patent Literature (PTL) 1, for instance). PTL 1 discloses a technique for causing a communication unit in a vehicle to provide, when an abnormality is detected by an abnormality detecting unit of the vehicle, an image of surroundings or an inside of the vehicle captured by a camera to a communication terminal of a user through a wireless communication line. With this, on-site image data is transmitted to the user when the abnormality occurs to the vehicle, and thus the user can recognize a on-site situation and obtain the image data as evidence for vehicle theft or the like.

CITATION LIST

Patent Literature

[PTL 1] Japanese Unexamined Patent Application Publication No. 2003-127835

SUMMARY OF INVENTION

Technical Problem

Unfortunately, the technique disclosed in PTL 1 does not necessarily function effectively depending on a parking location of the vehicle. This is because wireless communication is subject to influence of various conditions such as a base station density around the parking location of the vehicle and radio wave absorption due to a size, material, or the like of surrounding buildings. Therefore, the security of the vehicle cannot be ensured (e.g., the user cannot obtain evidence for vehicle theft or the like.) by applying the technique disclosed in PTL 1, depending on a radio wave condition (possibility of wireless communication) of a place where the vehicle is parked.

In view of this, the present invention provides an image transmitting device that is to be mounted on a vehicle and enhances security of the vehicle that is parked.

Solution to Problem

An image transmitting device according to one aspect of the present invention is an image transmitting device to be mounted on a vehicle, the image transmitting device including: a checking unit configured to check communicability with an external device outside of the vehicle, at a parking place of the vehicle; a providing unit configured to provide notification information based on a result of the checking by the checking unit; a capturing unit configured to capture an image while the vehicle is parked; and a transmitting unit configured to transmit the image captured by the capturing unit to the external device.

Advantageous Effects of Invention

An image transmitting device according to the present invention makes it possible to enhance security of a parked vehicle.

DESCRIPTION OF EMBODIMENTS

Figure 1:
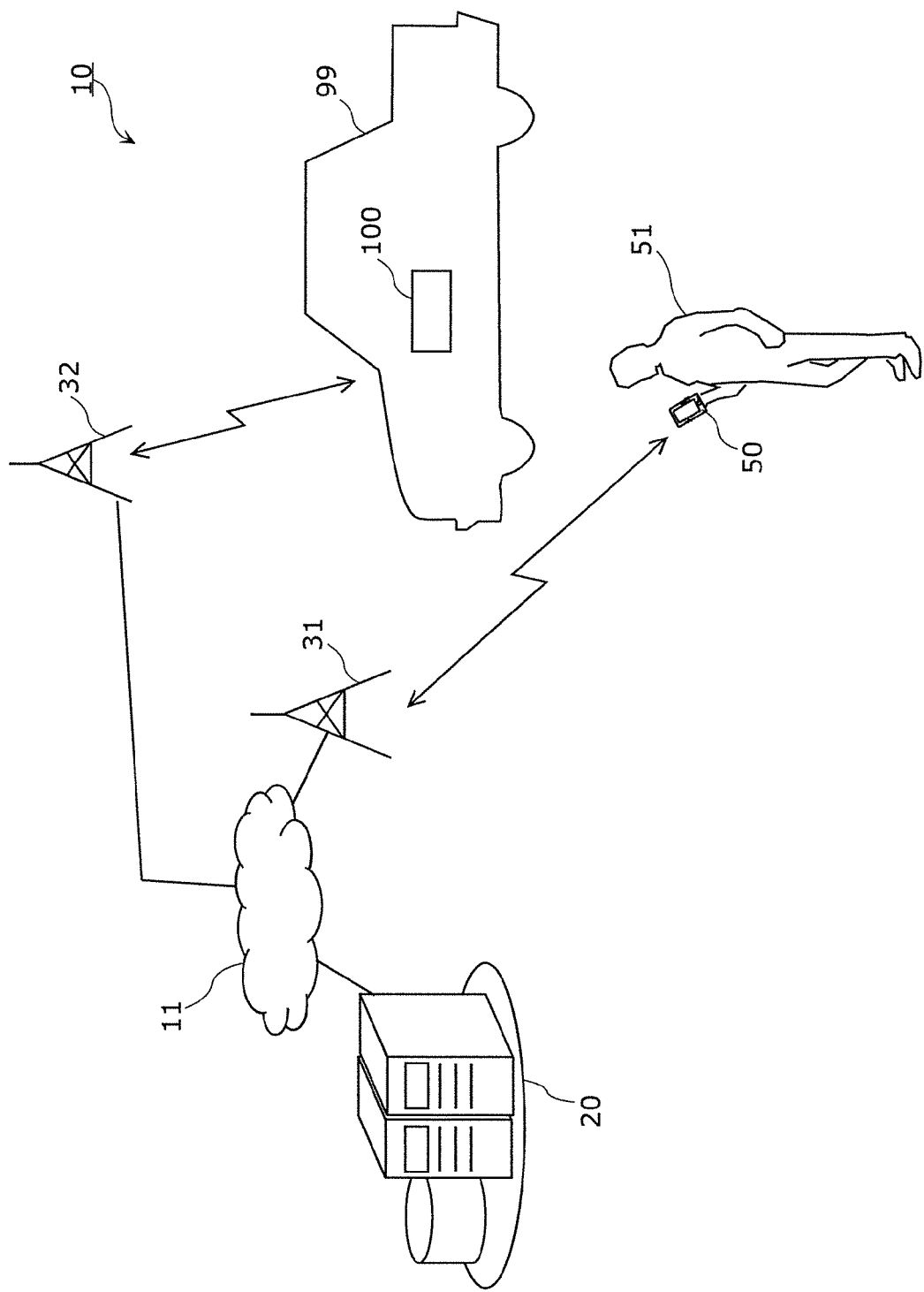
FIG. 1 is a schematic diagram showing a vehicle security system according to an embodiment.

In order to enhance security of a vehicle, an image transmitting device according to one aspect of the present invention is an image transmitting device to be mounted on a vehicle, the image transmitting device including: a checking unit configured to check communicability with an external device outside of the vehicle, at a parking place of the vehicle; a providing unit configured to provide notification information based on a result of the checking by the checking unit; a capturing unit configured to capture an image while the vehicle is parked; and a transmitting unit configured to transmit the image captured by the capturing unit to the external device. It is to be noted that since the image transmitted by the transmitting unit is subject to influence of a communication environment (e.g., buildings surrounding the parking place) for the external device at the parking place, the image is not always necessarily received by the external device. A user (driver), however, can guess, from the notification information, whether the image captured while the vehicle is parked can be transmitted to an outside of the vehicle, and can change the parking place as necessary, for instance, and thus it is possible to enhance the security of the parked vehicle.

Here, for example, the checking unit may be configured to perform the checking by measuring, at the parking place of the vehicle, reception electric field intensity of radio waves from the external device.

With this, the communicability with the external device is checked by the measuring, and thus when the vehicle is parked, the user can surely guess whether the image transmission for ensuring the security is possible.

Moreover, the image transmitting device may include: an obtaining unit configured to obtain, for each of positions, communicability position information from a server device outside of the vehicle, the communicability position information indicating communicability with the external device at the position; a receiving unit configured to receive designation of a position of a parking place as a planned arrival place of the vehicle; a positioning unit configured to measure a position of the vehicle; and a transferring unit configured to transfer, to the server device, the position of the parking place and the reception electric field intensity measured at the parking place by the checking unit, wherein the checking unit may be configured to perform, during a period for which the vehicle has not arrived at the parking place of which the designation is received by the receiving unit, the checking for the communicability with the external device at the parking place, based on the communicability position information.

With this, the communicability with the external device at the parking place is checked before the vehicle arrives at the parking place, and thus before parking the vehicle, the user can change a planned parking place (planned arrival place of the vehicle) as necessary based on a result of the checking. In addition, information about the communicability with the external device at each place is accumulated in the server device and can be put to practical use.

Furthermore, the image transmitting device may further include a positioning unit configured to measure a position of the vehicle, wherein the checking unit may be further configured to examine communicability with the external device by measuring reception electric field intensity of radio waves from the external device, at a place other than the parking place of the vehicle, and the providing unit may be further configured to provide information based on a result of the examining, when a result of the checking shows that the communicability is denied, the information indicating a position which is within a predetermined distance range from the parking place of the vehicle and where communication with the external device is possible.

With this, when the result of the checking at the parking place shows that the communicability with the external device is denied, the user can know a parking place candidate that is to be a changed parking place.

Moreover, the image transmitting device may further include: a receiving unit configured to receive designation of a position of a parking place as a planned arrival place of the vehicle; and a positioning unit configured to measure a position of the vehicle, wherein the checking unit may be further configured to examine communicability with the external device by measuring reception electric field intensity of radio waves from the external device, at a place other than the parking place of the vehicle, and the providing unit may be further configured to provide information based on a result of the examining by the checking unit, when the vehicle is at a position within a predetermined distance range from the parking place as the planned arrival place, the information indicating a position where communication with the external device is possible.

With this, when the vehicle approaches a position at a certain distance or less from the planned arrival place (planned parking place) of the vehicle, the user can know a parking place candidate.

Furthermore, the checking unit may be further configured to examine communicability with the external device by measuring reception electric field intensity of radio waves from the external device, at a place other than the parking place of the vehicle, and the transmitting unit may be configured to avoid transmitting the image when the result of the checking shows that the communicability is denied, and subsequently transmit the image when a result of the checking or a result of the examining shows that the communicability is confirmed.

With this, the image captured at the parking place is transmitted when the communication with the outside becomes possible even in the case where the image was not successfully transmitted to the outside, and thus it is possible to obtain, at the outside of the vehicle, an image as evidence for vehicle theft or a stolen item in the vehicle.

Moreover, the providing unit may be configured to provide the notification information indicating, according to the measured reception electric field intensity, one of levels of the communicability that is the result of the checking.

With this, the user can check the notification information and judge whether the parking place is suitable for ensuring the security of the vehicle.

Furthermore, the checking unit may be configured to perform the checking by confirming, through communication with the external device, that the image transmitted by the transmitting unit at the parking place of the vehicle is received by the external device.

With this, the communicability with the external device is checked by actually transmitting the image at the parking place, and thus the user can surely understand whether the security of the vehicle is sufficiently ensured at the parking place, based on a result of the checking.

Moreover, the image transmitting device may further include a detecting unit configured to determine whether the vehicle is in a predetermined stopped state, wherein the checking unit may be configured to perform the checking when the detecting unit determines that the vehicle is in the predetermined stopped state, and avoid the checking when the detecting unit determines that the vehicle is not in the predetermined stopped state. Here, the predetermined stopped state is a parking state, for example.

With this, it is possible to efficiently check the communicability with the external device to ensure the security of the vehicle.

Furthermore, the image transmitting device may further include an abnormality detecting unit configured to detect occurrence of an abnormal situation by analyzing the image captured by the capturing unit, wherein the providing unit may be further configured to provide, when the abnormality detecting unit detects the occurrence of the abnormal situation, information indicating the occurrence of the abnormal situation, in the case where the result of the checking shows that the communicability is denied.

With this, when the abnormal situation occurred, the user who has returned to the parked vehicle can see the information indicating the occurrence of the abnormal situation, and take a prompt action.

Moreover, the capturing unit may be configured to record sequentially captured images onto a storage medium, the transmitting by the transmitting unit may be transmitting a captured image recorded on the storage medium, and the providing unit may be further configured to provide information indicating an amount of time that is available for the sequentially captured images to be recorded onto the storage medium, when the result of the checking shows that the communicability is denied.

With this, when the captured image cannot be transmitted to the outside, the user can know how long images can be recorded.

Furthermore, the capturing unit may be configured to record sequentially captured images onto a storage medium, and perform the capturing or the recording according to a predetermined condition, the transmitting by the transmitting unit may be transmitting a captured image recorded on the storage medium, the image transmitting device may further receive an input for a scheduled parking time when the result of the checking shows that the communicability is denied, and the capturing unit may be configured to set the predetermined condition to continue performing the capturing and the recording for the scheduled parking time.

With this, when the captured image cannot be transmitted to the outside, images can be captured and recorded for the scheduled parking time inputted by the user, and thus the security of the vehicle can be enhanced.

Moreover, the image transmitting device may further include a sensing unit configured to sense that a person is approaching the vehicle, wherein the capturing unit may be configured to perform the capturing when the sensing unit continuously performs the sensing for a predetermined time or longer.

With this, images can be efficiently captured to ensure the security of the vehicle. It is to be noted that although a direction of a capturing camera as the capturing unit may be toward at lease one of the outside and the inside of the vehicle, the direction is assumed to be adjusted to a direction suitable for ensuring the security when the image transmitting device is mounted on the vehicle.

Furthermore, the image transmitting device may further include: an obtaining unit configured to obtain, for each of positions, communicability position information from a server device outside of the vehicle, the communicability position information indicating communicability with the external device at the position; and a receiving unit configured to receive designation of a position of a parking place as a planned arrival place of the vehicle, wherein the checking unit may be configured to perform the checking for the communicability with the external device at the parking place of which the designation is received by the receiving unit, based on the communicability position information.

With this, the communicability with the external device at the parking place is checked before the vehicle arrives at the parking place, and thus before parking the vehicle, the user can change a planned parking place (planned arrival place of the vehicle) as necessary based on a result of the checking.

Moreover, the providing unit may be further configured to provide information indicating a parking place candidate when the result of the checking shows that the communicability is denied.

With this, the user can know the parking place candidate for ensuring the security of the parked vehicle.

Furthermore, the providing unit may be configured to perform the providing by displaying the notification information on one region of a driver display panel of the vehicle.

With this, for instance, the user can see the display panel while sitting behind the wheel, to easily confirm whether the parking place is to be changed or the like.

Moreover, the capturing unit may be further configured to capture an infrared image using an infrared camera directed toward an outside of the vehicle while the vehicle is traveling.

With this, since a situation of the outside of the vehicle (e.g., road surface) that is difficult to identify in a visual light range is captured, and an image obtained by capturing the situation is transmitted to the server device outside of the vehicle or the like, information indicating a road surface condition or the like can be accumulated in the server device.

Furthermore, an image transmitting device according to one aspect of the present invention is an image transmitting device to be mounted on a vehicle, the image transmitting device including: a capturing unit configured to capture an infrared image using an infrared camera directed toward an outside of the vehicle while the vehicle is traveling; and a transmitting unit configured to transmit the infrared image captured by the capturing unit to an external device.

With this, since a situation of the outside of the vehicle (e.g., road surface) that is difficult to identify in a visual light range is captured while the vehicle is traveling, and an image obtained by capturing the situation is transmitted to the server device outside of the vehicle or the like, information indicating a road surface condition or the like can be accumulated in the server device. Then, the server device makes it possible to, for instance, disclose or distribute the information indicating the road surface condition on the Internet.

Moreover, the image transmitting device may further include a sensing unit configured to sense that a braking operation of the vehicle has been performed, wherein the capturing unit may be configured to perform the capturing when the sensing unit senses that the braking operation has been performed.

With this, the capturing can be efficiently performed in a situation where attention is required when the vehicle is traveling.

Furthermore, the image transmitting device may further include a checking unit configured to check communicability with an external device outside of the vehicle, wherein the capturing unit may be configured to record sequentially captured infrared images onto a storage medium, and the transmitting unit may be configured to avoid transmitting information about the infrared image when the result of the checking shows that the communicability is denied, and subsequently transmit a captured infrared image recorded on the storage medium when a result of the checking shows that the communicability is confirmed.

With this, an image captured when transmission to the outside becomes possible is immediately transmitted, and thus the server device outside of the vehicle or the like makes it possible to immediately distribute new information, for instance.

These general and specific aspects may be implemented using a device, a system, a method, an integrated circuit, a computer program, a computer-readable recording medium, and so on, or any combination of systems, methods, integrated circuits, computer programs, computer-readable recording media, and so on.

The following describes embodiments with reference to the drawings.

Each of the embodiments described below shows a preferred specific example of the present invention. The numerical values, shapes, materials, structural elements, the arrangement and connection of the structural elements, steps, the processing order of the steps, etc. shown in the following embodiments are mere examples, and therefore do not limit the present invention. Therefore, among the structural elements in the following embodiments, structural elements not recited in any one of independent claims indicating the most superordinate concept of the present invention are described as arbitrary structural elements. Moreover, each of figures is diagrammatic representation, and is not necessarily strictly illustrated.

In each embodiment, a vehicle security system including an image transmitting device mounted on a vehicle, a mobile terminal held by a driver (user) of the vehicle, and so on will be mainly described.

(Embodiment 1)

Hereinafter, Embodiment 1, one aspect of the present invention, will be described.

(Configuration)

FIG. 1 is a schematic diagram showing a vehicle security system 10 according to an embodiment of the present invention.

The vehicle security system 10 is a system mainly for capturing, with a camera, an image of surroundings or an inside of a vehicle under a certain condition and transmitting the image to a mobile terminal of a user (driver) so as to ensure security of the vehicle. Here, an automobile is used as an example of the vehicle for illustrative purposes.

As shown in the figure, the vehicle security system 10 includes, for instance, a server device 20, a base station 31, a base station 32, an image transmitting device 100 mounted on an automobile 99, and a mobile terminal 50 held by a user 51, all of which are connected by a network 11 such as the Internet. It is to be noted that although only the one automobile is shown in the figure, the vehicle security system 10 may include image transmitting devices mounted on respective automobiles, and many base stations. The base stations 31 and 32 are, for example, devices that are placed in specific locations and wirelessly communicate with a mobile station such as the image transmitting device 100 and the mobile terminal 50. The mobile station is capable of communicating with the server device 20 or the like and another mobile station connected to the network 11 via those base stations. The server device 20 is a device that accumulates images or the like transmitted by mobile stations or the like and transfers the accumulated images or the like to the mobile stations. For instance, when the image transmitting device 100 transmits a captured image of surroundings or the like of the vehicle that is attached to an e-mail intended for the mobile terminal 50, the server device 20 has a function as a mail server. With this, for example, the image transmitted by the image transmitting device 100 mounted on the automobile 99 parked at a position where communication with the base station 32 is possible can arrive at the base station 32 and the mobile terminal 50 of the user 51 via the base station 32. It is to be noted that an image may not be attached to an e-mail for transmission.

The mobile terminal 50 is a terminal device such as a smart phone and a tablet carried by the user 51, the driver, and includes a memory, a processor, an input interface, a display, a communication interface that wirelessly connects to the network 11 via the base station 31 or the like, and so on. The memory is a ROM, a RAM, or the like, and stores a control program for achieving control processing for controlling each component of the mobile terminal 50, a setting value used by the control program, and so on. Moreover, the memory is also used to temporarily store each value used when the processor executes the control program. The processor executes the control program stored in the memory, and accordingly the mobile terminal 50 fulfills a function to receive an image transmitted by the image transmitting device 100 and display the image on a display. With this, the user 51 who has left the automobile 99 after parking the automobile 99 can check a situation of surroundings of the automobile 99 with the carried mobile terminal 50. It is to be noted that the communication interface of the mobile terminal 50 enables, for instance, communication with a base station or the like through 3rd Generation (3G) network used for a mobile telephone network or wireless communication such as 4G (LTE: Long Term Evolution).

Hereinafter, a configuration of the image transmitting device 100 mounted on the automobile 99 will be described.

Figure 2:
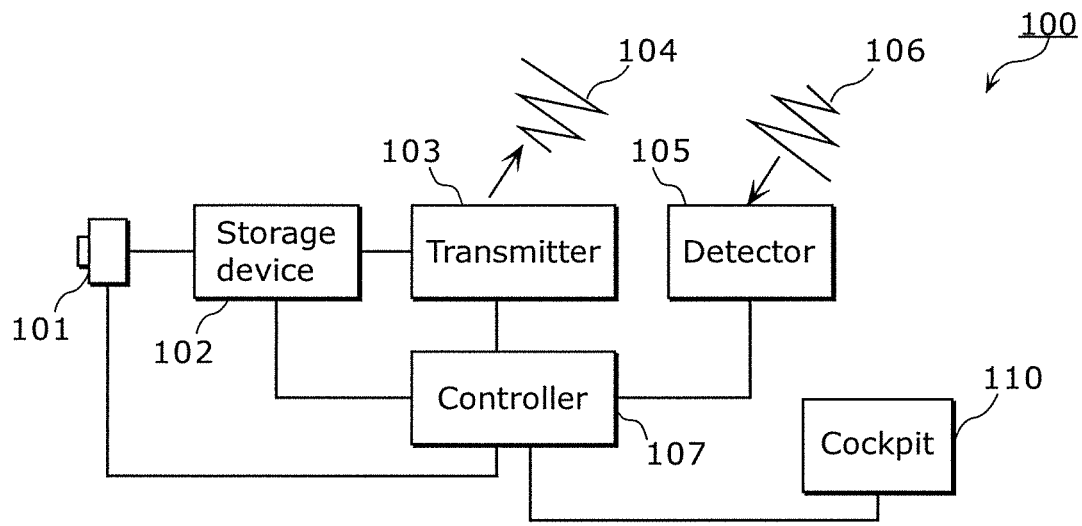
FIG. 2 is a schematic block diagram of an image transmitting device according to Embodiment 1.

FIG. 2 is a schematic block diagram of the image transmitting device 100. As shown in the figure, the image transmitting device 100 includes components (hardware configuration) such as an image capturing device (camera) 101, a storage device 102, a transmitter 103, a detector 105, a controller 107, and a cockpit 110. Moreover, the image transmitting device 100 may operate with power from a battery of the automobile 99, for example, and include an interface with a control system (system that detects an engine stop of an automobile and outputs a status of the automobile) of the automobile 99, for instance.

Figure 3:
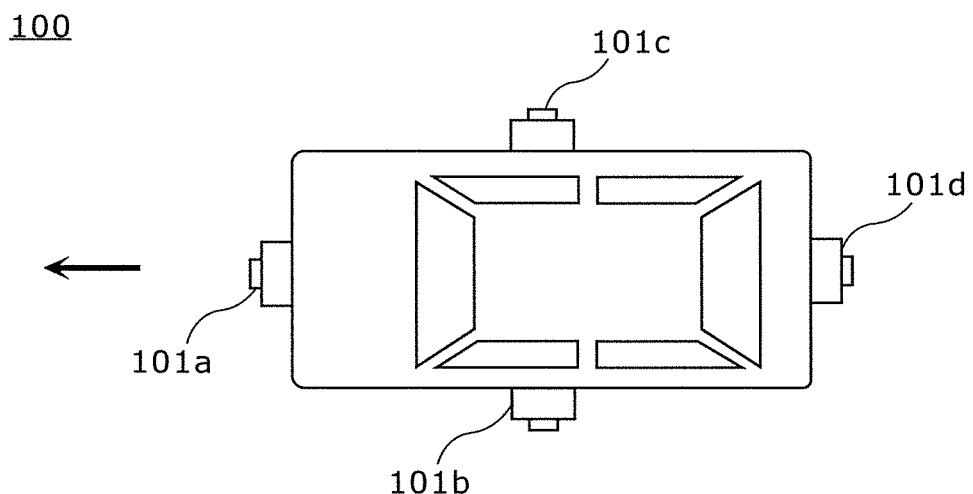
FIG. 3 is a diagram showing exemplary placement of image transmitting devices to an automobile.

The image capturing device 101 is a camera using a charge coupled device (CCD), a complementary MOS (CMOS) sensor, or the like for capturing the inside or outside of the automobile 99, and has sensitivity in at least part of a visual light range (wavelength of 400 to 700 nanometers), for instance. Although the single image capturing device 101 is shown in FIG. 2, the number and placement of the image capturing devices 101 may be changed. For example, like image capturing devices 101a to 101d shown in FIG. 3, some of the image capturing devices 101 may be placed to the front, back, left, and right sides of the automobile 99. Furthermore, some of the image capturing devices 101 may be placed to the front side according to angles of view at which the cameras are capable of performing capturing, to capture a scene ahead of the automobile 99. It is to be noted that an arrow in FIG. 3 indicates a traveling direction of the automobile 99.

The storage device 102 is a storage medium (recording medium) such as a memory and hard disk for temporarily storing images captured by the image capturing device 101.

The transmitter 103 is a communication circuit that wirelessly transmits, using radio waves, the images temporarily stored in the storage device 102, to a base station (e.g., the base station 31) outside the automobile, and modulates images and transmits the images as transmission waves 104 to a radio antenna of the base station.

The detector 105 is a communication circuit that detects (receives) detection waves 106, radio waves transmitted from the radio antenna of the base station (e.g., the base station 31) outside the automobile, and is capable of measuring reception electric field intensity of the detection waves 106.

The cockpit 110 is a display panel that notifies information to allow the driver (user) who has taken the driver's seat of the automobile 99 to visually recognize the information. The display panel may include a display, for instance, and may be an instrument panel for displaying meters (e.g., speedometer) necessary for driving, for instance. Moreover, the display panel may include a component for receiving an operation performed by the user such as a touch panel covering a surface of the display or the like and buttons arranged around the display.

The controller 107 is a device that controls the components of the image transmitting device 100 such as the image capturing device 101, the storage device 102, the transmitter 103, the detector 105, and the cockpit 110. The controller 107 has, for instance, a processor and a memory. The controller 107 performs control of each component such as transmitting a control signal to the component, by the processor executing a control program stored in the memory, and thus achieves a function of each functional structural element that is to be described later.

Figure 4:
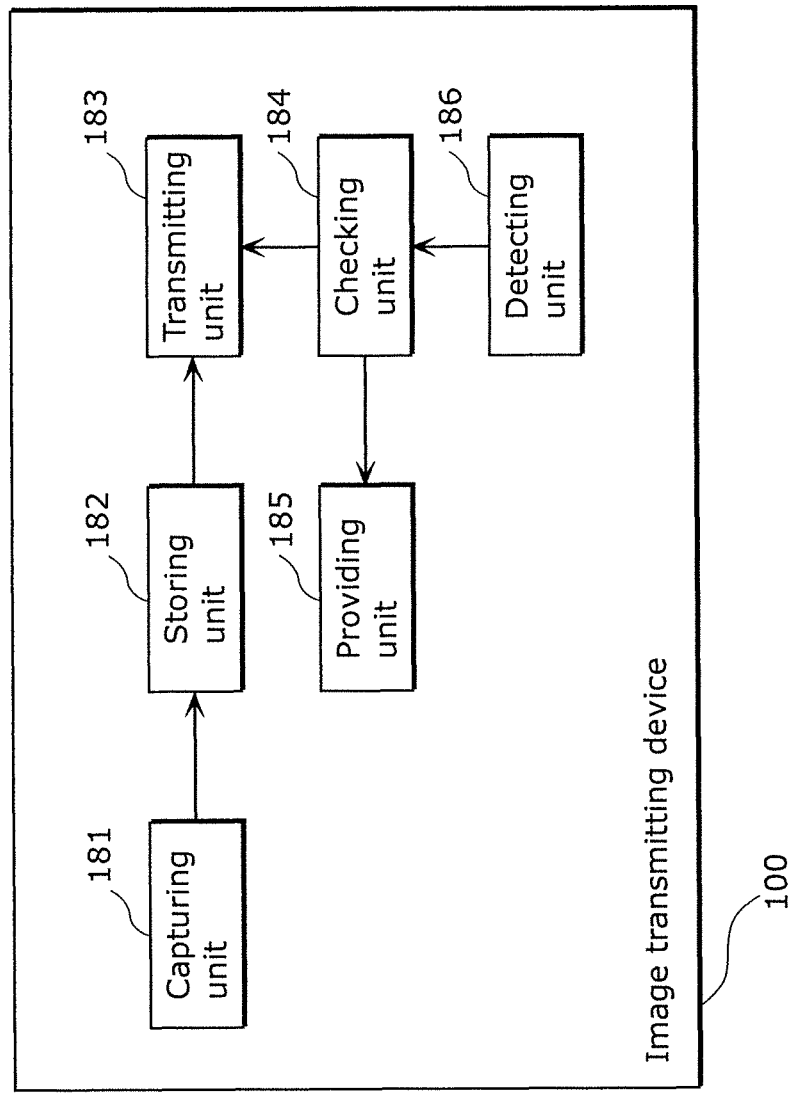
FIG. 4 is a functional block diagram of an image transmitting device.

FIG. 4 is a functional block diagram of the image transmitting device 100.

The image transmitting device 100 having the above-mentioned configuration includes a capturing unit 181, a storing unit 182, a transmitting unit 183, a checking unit 184, a providing unit 185, and a detecting unit 186 in terms of a functional aspect, that is, as functional structural elements.

Here, the capturing unit 181 is composed of the image capturing device 101 and the controller 107. The capturing unit 181 has a function to sequentially capture an image under a certain condition and store the image into the storing unit 182.

The storing unit 182 is realized by one storage region of the storage device 102, and has a function to store an image captured by the capturing unit 181.

The transmitting unit 183 is composed of the transmitter 103 and the controller 107. The transmitting unit 183 has a function to read an image stored in the storing unit 182 and transmit the image to an external device under a certain condition. Here, the external device is a device outside the automobile 99, and is a base station such as the base station 31, for instance. It is to be noted that the image transmitted to the base station is transmitted to, for example, the mobile terminal 50 carried by the user 51 via the server device 20 or another base station. It is also to be noted that the transmitting unit 183 may delete, from the storing unit 182, an image that has been successfully transmitted. Moreover, for instance, the transmitting unit 183 may store into the storing unit 182 information indicating which image has been transmitted (is deletable), and delete a deletable image based on the information and according to a need for the capturing unit 181 to store a new image.

The checking unit 184 is composed of the detector 105 and the controller 107. The checking unit 184 has a function to perform a checking process for checking communicability with an external device by measuring reception electric field intensity of the detection waves 106, and to transmit, to the providing unit 185 and the transmitting unit 183, information indicating a check result. The external device is the base station 31, for instance. It is to be noted that in the checking unit 184, a frequency band of radio waves received as the detection waves 106 by the detector 105 is previously determined to correspond to a frequency band in which the transmitter 103 transmits an image. The transmitting unit 183 determines whether a certain condition for transmitting an image is satisfied according to a check result of the checking unit 184, and avoids transmitting the image when the communicability is denied.

The providing unit 185 is composed of the cockpit 110 and the controller 107, and has a function to display on the cockpit 110 display content (notification information) according to a check result transmitted by the checking unit 184. It is to be noted that the providing unit 185 may use, instead of the cockpit 110, a head-up display, a display of a car navigation system, or the like for display. For example, the providing unit 185 may use, for display, a display of the mobile terminal of the user connected through wire or near field communication (e.g., Bluetooth (registered trademark)) to the automobile 99. In addition to the displaying, the providing unit 185 may give notice of content corresponding to a check result, using voice such as a speaker.

The detecting unit 186 is composed of the controller 107 and, for example, an interface with the control system of the automobile 99. The detecting unit 186 has a function to detect a state where the automobile 99 is parked and a state where the automobile 99 is started after being parked (the automobile 99 is driven), and to transmit a detection result to the checking unit 184. For instance, the control system of the automobile 99 detects an engine stop and manages a state such as whether the automobile is parked or the like, and the detecting unit 186 determines whether the automobile is parked or the like based on a signal from the control system. It is to be noted that instead of obtaining a signal from the control system based on an engine stop or the like, the detecting unit 186 may use an output of an acceleration sensor, a global positioning system (GPS) receiver, or the like to determine whether the automobile is parked (i.e., in a predetermined stopped state).

(Operation)

Hereinafter, an operation performed by the image transmitting device 100 having the above-mentioned configuration will be described in line with FIG. 5.

Figure 5:
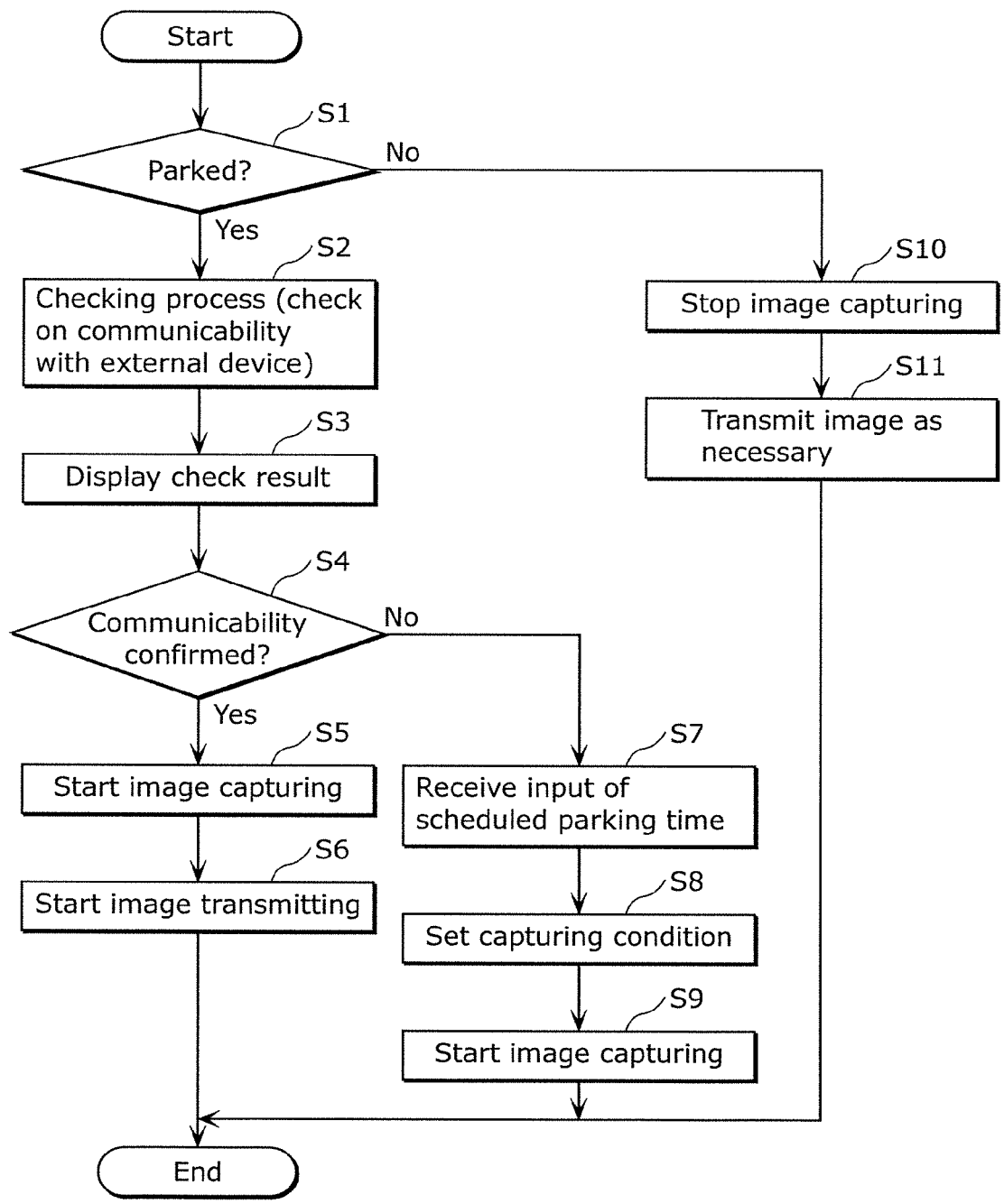
FIG. 5 is a flow chart showing operation performed by an image transmitting device.

FIG. 5 is a flow chart showing an operation performed by the image transmitting device 100. The operation shown in the figure is an operation performed by the image transmitting device 100 when the detecting unit 186 determines that the automobile 99 has been parked or has been started after being parked.

When the detecting unit 186 of the image transmitting device 100 determines that the automobile 99 has been parked (step S1), the checking unit 184 checks communicability with an external device by measuring reception electric field intensity of detection waves 106 that can be received at a parking place of the automobile 99 (step S2). When the automobile 99 is parked as a result of its engine stop or the like, it is checked whether the image transmitting device 100 is capable of transmitting an image captured to ensure security while the automobile 99 is parked, to the external device at the parking place. Generally, when radio waves from the external device cannot be stably received due to influence of buildings or the like surrounding the parking place, stable transmission to the external device cannot also be performed, and thus checking communicability with the external device by measuring reception electric field intensity leads to roughly show transmissibility. When transmission to the external device is possible, an image can be checked with, for example, the mobile terminal 50 carried by the user 51 (driver) away from the automobile 99 while the automobile 99 is parked, and the security is ensured. When, for instance, the checking in step S2 shows that the reception electric field intensity measured for the detection waves 106 from the base station 31 near the parking place is greater than a predetermined level, the communicability is confirmed, and when the reception electric field intensity is less than the predetermined level, the communicability is denied. Here, the predetermined level is a value set previously based on an experiment, theoretical rationalization, or the like to allow the predetermined level to be reception electric field intensity of a signal from a base station in a state where stable communication is possible between base stations. It is to be noted that the measuring of reception electric field intensity may be performed once or more than once, and when reception electric field intensity greater than the predetermined level is measured each time, the communicability may be confirmed by way of showing that stable communication is possible, and in other cases, the communicability may be denied. It is to be noted that while the detecting unit 186 determines that the automobile 99 is not parked, the checking unit 184 avoids performing the checking.

Figure 6:
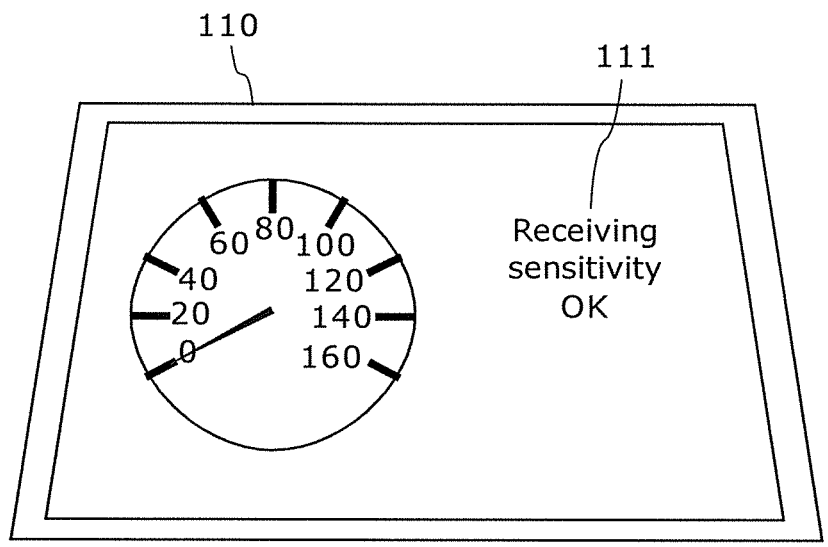
FIG. 6 is a diagram showing a display example (displayed receiving sensitivity) of a cockpit of an automobile.
Figure 7:
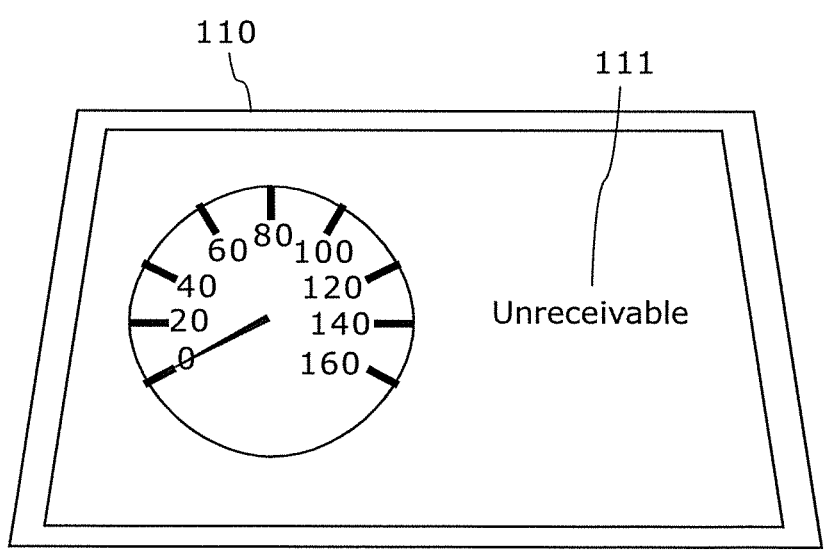
FIG. 7 is a diagram showing a display example (displayed receiving sensitivity) of a cockpit of an automobile.
Figure 8:
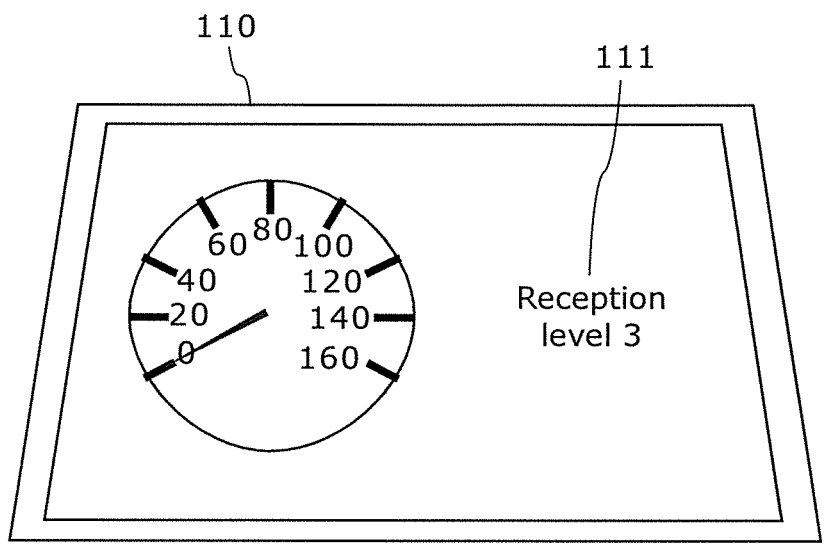
FIG. 8 is a diagram showing a display example (displayed receiving sensitivity) of a cockpit of an automobile.

Subsequently, the providing unit 185 displays on the cockpit 110 display content corresponding to a check result of the checking unit 184 (step S3). When the check result shows that the communicability is confirmed, the cockpit 110 displays receiving sensitivity information 111 such as "Receiving sensitivity OK" shown in FIG. 6. By looking at the display on the cockpit 110 such as "Receiving sensitivity OK," the user (driver) who has stopped the engine of the automobile 99 can recognize that the image transmitting device 100 is capable of stably transmitting an image since a signal from a neighboring base station can be received. In other words, the user can confirm that the security will be ensured. Moreover, when the check result shows that the communicability is denied, the cockpit 110 displays the receiving sensitivity information 111 such as "Unreceivable" shown in FIG. 7. When looking at the display of "Unreceivable" on the cockpit 110, the user (driver) changes the parking place, looks for a place where the receiving sensitivity information 111 shows "Receiving sensitivity OK," for example, and parks the automobile 99 at the place. It is to be noted that the providing unit 185 may display the reception electric field intensity measured by the checking unit 184 as one of reception levels divided into stages, and an exemplary display in this case is shown in FIG. 8. In the figure, the receiving sensitivity information 111 is displayed as "Reception level 3" which is highest when the reception levels range from the lowest 0 (meaning reception electric field intensity is substantially equal to zero) to the highest 3 (meaning reception electric field intensity is highest).

Next, when the check result of the checking unit 184 shows that the communicability is confirmed (step S4), the capturing unit 181 starts to capture an image of surroundings or an inside of the automobile 99 based on a capturing condition (e.g., capturing interval, image quality, and image compression method) previously set, for instance. It is to be noted that each of images sequentially captured by the capturing unit 181 (images generated through capturing) is stored into the storing unit 182. Then, the transmitting unit 183 reads from the storing unit 182 the image captured by the capturing unit 181, and starts to transmit the image to the external device (step S6). A final destination of an image is previously set by the user, and is the mobile terminal 50 carried by the user 51, for example. With this, it is possible to take a prompt action to prevent the vehicle, an item inside the vehicle, or the like from being stolen while the vehicle is parked, and even when the vehicle or the item inside the vehicle is stolen, it is possible to store evidence for identifying a thief or the like.

Figure 9:
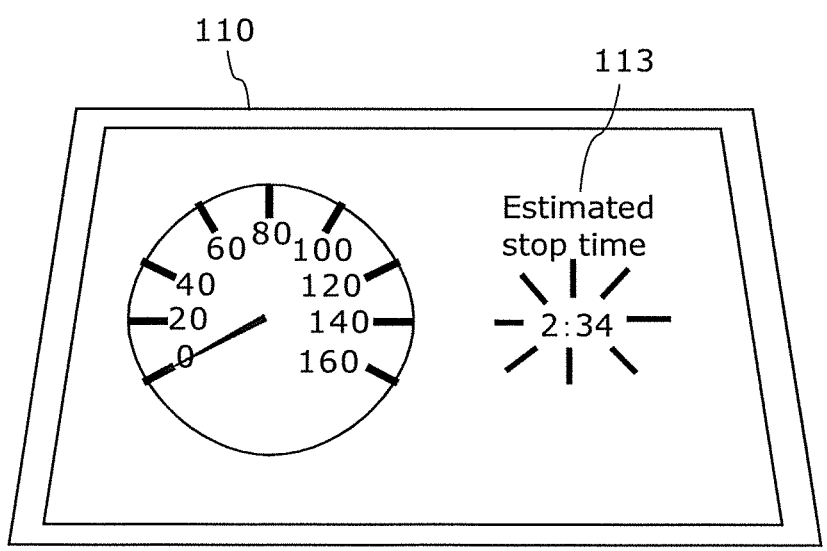
FIG. 9 is a diagram showing a display example (displayed estimated stop time) of a cockpit of an automobile.

Furthermore, when the check result shows that the communicability is denied in step S4, the image transmitting device 100 receives an input operation for a scheduled parking time by the user (step S7). Then, the capturing unit 181 sets (e.g., changes) a capturing condition based on a free space of the storing unit 182 to allow images captured for the scheduled parking time to be stored into the storing unit 182 (step S8), and starts to capture an image based on the capturing condition (step S9). For instance, when the scheduled parking time is two hours, the capturing unit 181 sets a capturing condition for capturing and recording such as a capturing interval, image quality, and a compression ratio of image data to allow images captured for the two hours to be stored into the storing unit 182. Examples of the capturing condition may include whether to use color or black and white, a pixel density, and a bit resolution, or other elements. It is to be noted that the providing unit 185 may be caused to display a time until capturing is stopped, according to the scheduled parking time for which the input operation is received in step S7. FIG. 9 shows an example where the cockpit 110 displays an estimated stop time 113. It is to be noted that although a captured image is not transmitted when the communicability with the external device is denied, for instance, an image that is stored in the storing unit 182 and is not yet transmitted may be displayed on the cockpit, a display, or the like by the providing unit 185 according to an operation performed by the user who has returned to the automobile 99. In addition, the image that is stored in the storing unit 182 and is not yet transmitted may be transmitted to the external device after the automobile 99 has moved to a place where transmission is possible.

Moreover, when the detecting unit 186 determines that the automobile 99 has been started after being parked in step S1, the capturing unit 181 stops capturing an image (step S10). Then, when an image that is not yet transmitted remains in the storing unit 182, the transmitting unit 183 may attempt to transmit the image to the external device (step S11). This transmission may be performed when, for instance, it is determined that communication with the external device becomes possible by measuring reception electric field intensity of the detection waves 106, or may be canceled in response to an operation performed by the user (driver).

It is to be noted that when the automobile 99 is parked, the capturing unit 181 starts to capture an image (steps S5 and S9). The user (driver) is highly likely to leave the automobile 99 after parking the automobile 99, and thus starting to capture an image when the automobile 99 is parked is useful in efficiently ensuring the security. However, the capturing may be performed before the automobile 99 is parked (e.g., still traveling), and constant capturing may be performed, for example.

Hereinafter, another processing method when the check result of the checking unit 184 shows that the communicability is denied will be described.

Figure 10:
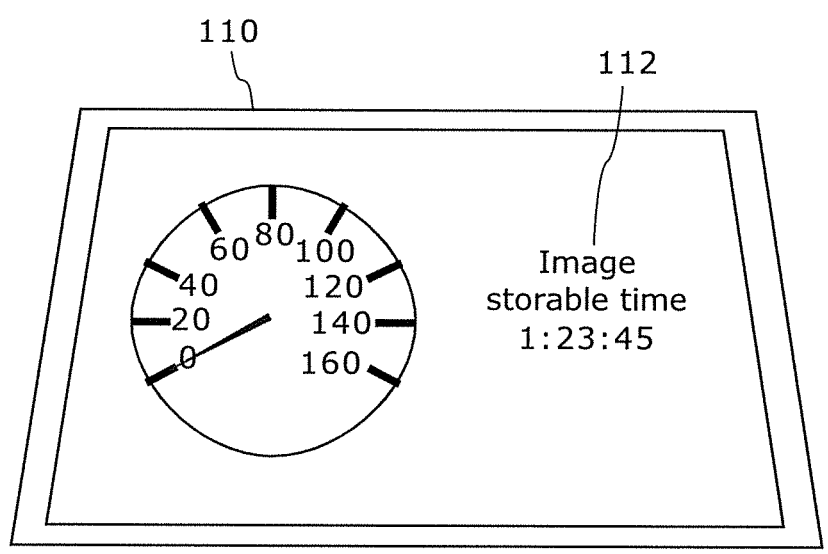
FIG. 10 is a diagram showing a display example (displayed image storing time) of a cockpit of an automobile.

When the check result shows that the communicability is denied, instead of steps S7 and S8 shown in FIG. 5, the image transmitting device 100 may determine a free space of the storing unit 182 and cause the providing unit 185 to display information about the free space. The information about the free space is, for instance, information indicating an amount of time available for captured images to be recorded onto the storage medium. FIG. 10 shows an example where the providing unit 185 displays an image storable time 112, information about a free space, on the cockpit 110. It is to be noted that a value of the image storable time 112 is calculated from a free space of the storing unit 182 (e.g., capacity of a region not used for an image that is not yet transmitted in the storing unit 182) and a capturing condition currently set to the capturing unit 181. With such displaying, the user can recognize that when the user returns to the automobile 99 within a time indicated by the image storable time 112, all images captured by the capturing unit 181 while the user is away from the automobile 99 can be stored continuously. It is to be noted that although when the automobile 99 is parked at a place where communication with the external device is impossible, the user cannot check an image while being away from the automobile 99, in the case where captured images are stored, it is possible to increase the probability of identifying a thief when an item inside the automobile 99 is stolen or the like.

As described above, in order to ensure the security of the parked automobile 99, the image transmitting device 100 determines whether an image can be transmitted to the external device by checking the communicability with the external device based on the measurement of the reception electric field intensity of the detection waves 106. In addition, for instance, the image transmitting device 100 provides, by displaying the check result, the user with a basis for judgment whether to change the parking place in order to ensure further security.

(Modification 1)

Hereinafter, an image transmitting device 100a resulting from modifying part of the image transmitting device 100 will be described.

Figure 11:
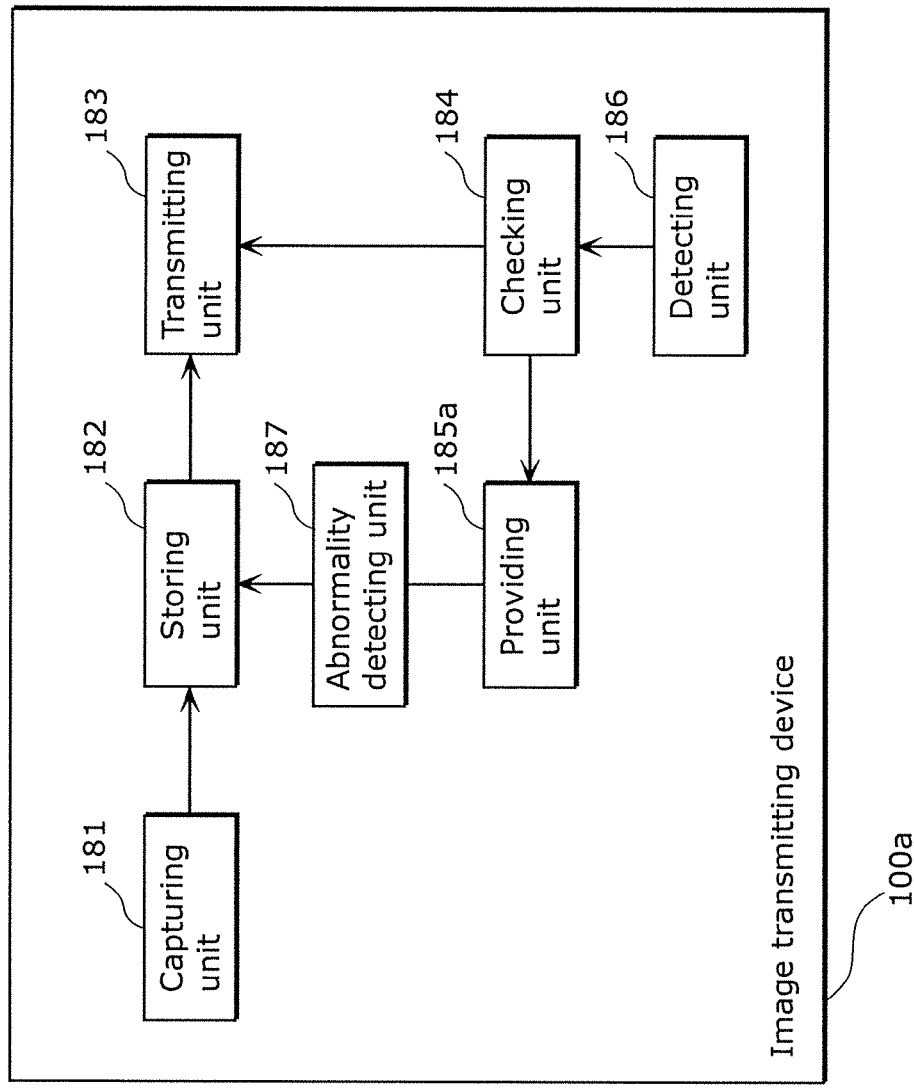
FIG. 11 is a functional block diagram of an image transmitting device according to a modification.

FIG. 11 is a functional block diagram of the image transmitting device 100a that is a modification of the image transmitting device 100.

The image transmitting device 100a includes a providing unit 185a and an abnormality detecting unit 187 that are not included in the image transmitting device 100, in addition to the capturing unit 181, the storing unit 182, the transmitting unit 183, the checking unit 184, and the detecting unit 186 that are the same functional structural elements as those of the image transmitting device 100. It is to be noted that components (hardware configuration) of the image transmitting device 100a are basically the same as those of the image transmitting device 100.

The abnormality detecting unit 187 includes the controller 107. The abnormality detecting unit 187 has a function to analyze an image captured by the capturing unit 181 and stored in the storing unit 182, and to determine whether a suspicious person is in the image, that is, detects occurrence of an abnormal situation. It is to be noted that the abnormality detecting unit 187 may include an image processing processor.

Figure 12:
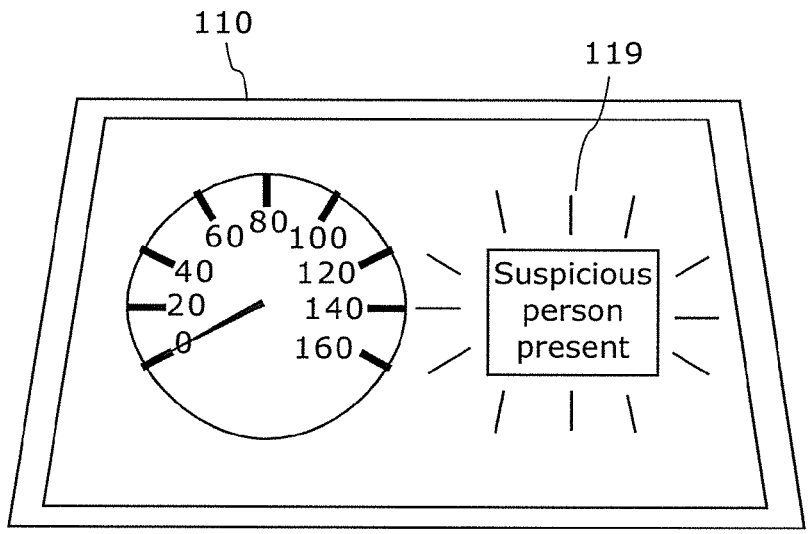
FIG. 12 is a diagram showing a display example (displayed occurrence of abnormality) of a cockpit of an automobile.

The providing unit 185a is composed of the cockpit 110 and the controller 107, and has the same function as the providing unit 185. When the abnormality detecting unit 187 determines that the suspicious person is in the image (abnormal situation has occurred), the providing unit 185a displays information indicating that the abnormal situation has occurred. When the occurrence of the abnormal situation is detected, for instance, as shown in FIG. 12, the providing unit 185a displays on the cockpit 110 abnormal occurrence information 119 such as "Suspicious person present." It is to be noted that instead of the cockpit 110, a head-up display, a display of a car navigation system, or the like may be used for display. Moreover, information indicating the presence of a suspicious person may be transmitted, for instance, through near field communication (Bluetooth (registered trademark)) to the mobile terminal of the user. With this, when the user is within a communication range of near field communication, the user can check the information indicating the presence of the suspicious person.

When the detecting unit 186 determines that the automobile 99 has been parked or started after being parked, the image transmitting device 100a having the above-mentioned configuration performs the operation shown in FIG. 5. When the automobile 99 is parked, capturing of an image is started (steps S5 and S9). Then, the image transmitting device 100a performs image analytical processing shown in FIG. 13 while the image is being captured.

Figure 13:
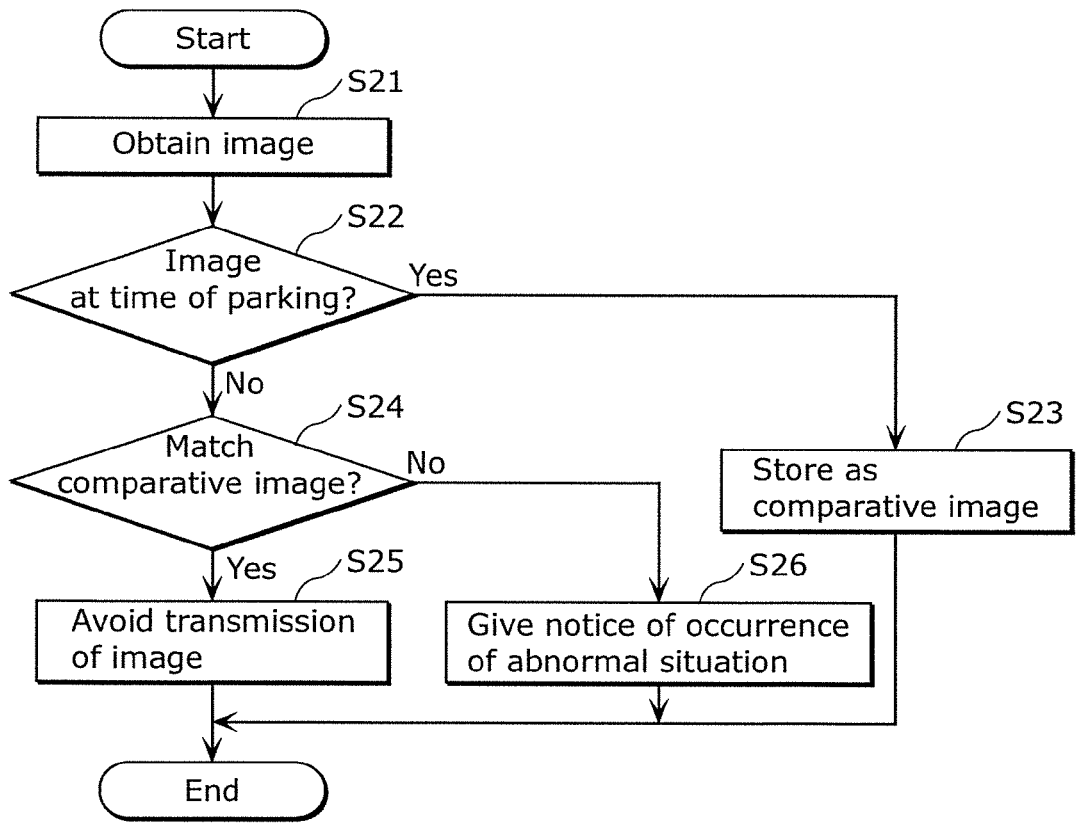
FIG. 13 is a flow chart showing image analytical processing.

FIG. 13 is a flow chart showing image analytical processing. Hereinafter, an operation performed by the image transmitting device 100a for the image analytical processing will be described in line with the figure. The image analytical processing shown in the figure is performed for each captured image. It is to be noted that when the capturing unit 181 is composed of image capturing devices such as the image capturing devices 101a to 101d shown in FIG. 3, each of the image capturing devices performs the image analytical processing shown in the figure.

The abnormality detecting unit 187 of the image transmitting device 100a obtains images one by one in capturing order that are sequentially captured by the capturing unit 181 and stored in the storing unit 182 (step S21). The abnormality detecting unit 187 first reads from the storing unit 182 an image captured first after the automobile 99 is parked. The abnormality detecting unit 187 stores the image captured first after the automobile 99 is parked (step S22) as a comparative image (step S23). The abnormality detecting unit 187 reads from the storing unit 182 an image captured second or subsequently (step S21). Since the image captured second or subsequently is not the image captured first (step S22), the abnormality detecting unit 187 compares the image captured second or subsequently and the stored comparative image. In other words, the abnormality detecting unit 187 determines whether the image captured second or subsequently matches the comparative image (step S24). When the image captured second or subsequently matches the comparative image, the image captured second or subsequently is the same as the image captured immediately after the automobile 99 is parked; and thus it can be presumed that the image captured second or subsequently does not include the suspicious person or the like. When the image captured second or subsequently does not match the comparative image, it can be presumed that the image captured second or subsequently includes the suspicious person or the like. Since the determination of matching in step S24 is image comparison for checking the presence of the suspicious person, the determination of matching in step S24 does not require strict perfect match. It is to be noted that in the comparison, an image to be a difference between images may be generated, and the presence of a person may be determined by analyzing the image (e.g., pattern matching using the features of a person), to determine whether an abnormal situation has occurred. In addition, it may be determined that an abnormal situation has occurred when a person is present for a certain time (e.g., one or more minutes), and then the information indicating the occurrence of the abnormal situation in step S26 may be displayed.

When an obtained image matches the comparative image (step S24), the abnormality detecting unit 187 causes the transmitting unit 183 to avoid transmitting the obtained image (step S25). This avoidance of transmission is achieved by, for instance, the abnormality detecting unit 187 deleting an image in the storing unit 182. The avoidance of transmission makes it possible to reduce power consumption as well as a network load. It is to be noted that instead of the avoidance of transmission, the frequency of transmission may be reduced during a period when an abnormal situation does not occur (when each of sequentially obtained images matches a comparative image).

Moreover, when the obtained image does not match the comparative image in step S24, the abnormality detecting unit 187 gives the providing unit 185a notice of the occurrence of an abnormal situation, and the providing unit 185a displays information indicating the occurrence of the abnormal situation (step S26).

Figure 14:
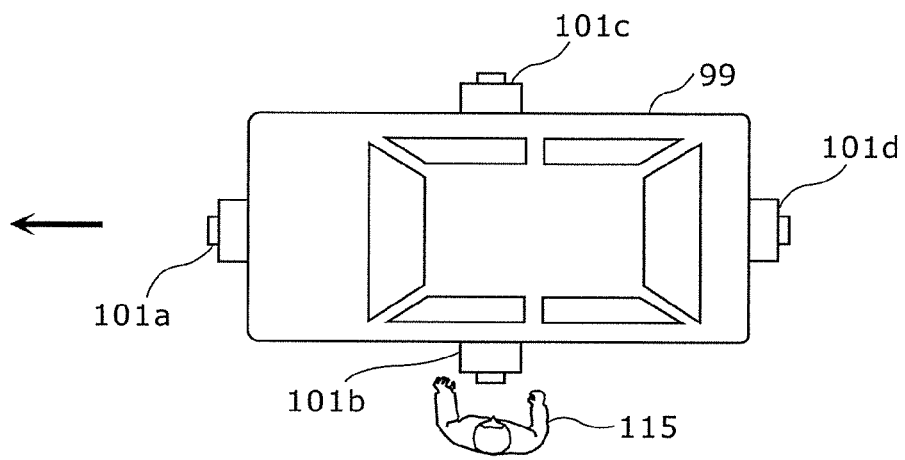
FIG. 14 is a diagram showing a situation where a suspicious person approaches a parked automobile.

The following will describe an exemplary operation at a time when a person 115 approaches the automobile 99 after the automobile 99 is parked in the case where the capturing unit 181 is composed of the image capturing devices 101a to 101d placed to the front, back, right, and left sides of the automobile 99 to capture the outside of the automobile 99 as shown in FIG. 14.

Figure 15:
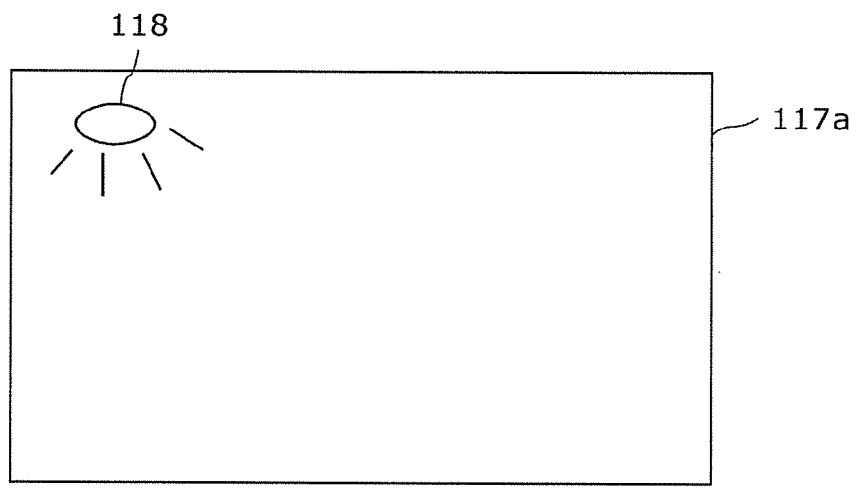
FIG. 15 is a diagram showing an exemplary image (comparative image) captured by an image capturing device.
Figure 16:
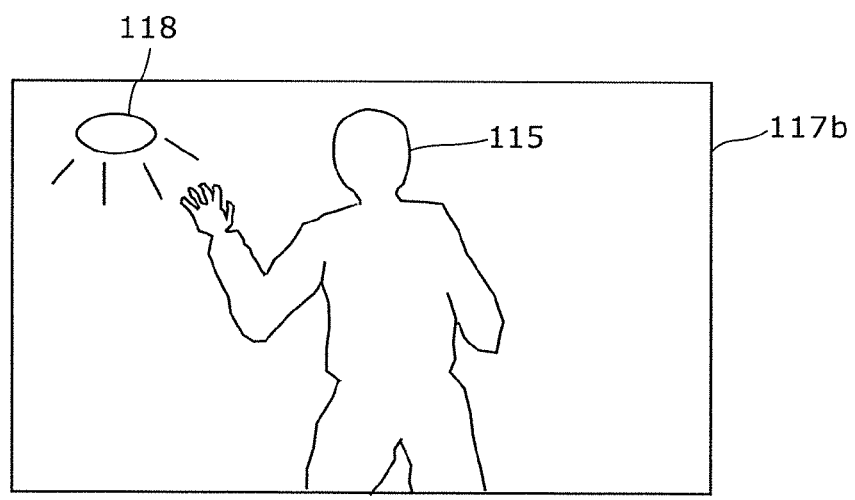
FIG. 16 is a diagram showing an exemplary image captured by an image capturing device and including a suspicious person.

First, when the automobile is parked, the abnormality detecting unit 187 stores an image captured by the image capturing device 101b as a comparative image (steps S21 to S23). This comparative image is an image 117a shown in FIG. 15, for example. The image 117a includes an electric lamp 118 within an angle of view of the image capturing device 101b (camera). An image that does not match the comparative image after being compared to the comparative image includes something that did not exist when the automobile 99 was parked. An image captured by the image capturing device 101 when the person 115 approaches the left side of the automobile 99 with respect to a traveling direction of the automobile 99 is an image 117b shown in FIG. 16, for instance. The image 117b includes the person 115 in addition to the electric lamp 118. Thus, the abnormality detecting unit 187 obtains the image 117b and gives the providing unit notice of the occurrence of an abnormal situation because the image 117b does not match the comparative image, and the providing unit 185a displays information indicating the occurrence of the abnormal situation (refer to FIG. 12) (steps S21, S22, S24, and S26). Even when images captured while the automobile 99 is parked have not been successfully transmitted, the user can immediately recognize, based on the display (refer to FIG. 12), that the suspicious person has approached the automobile 99 after returning to the automobile 99, and can take a prompt action such as checking whether anything abnormal has occurred inside and outside of the automobile 99.

It is to be noted that in addition to the providing unit 185a displaying the information indicating the occurrence of the abnormal situation in step S26, when the image transmitting device 100a is communicable with the external device, the image transmitting device 100a may transmit to the external device the information indicating the occurrence of the abnormal situation together with the captured image. With this, the user 51 away from the parked automobile 99 can receive and confirm the information indicating the occurrence of the abnormal situation with the carried mobile terminal 50 via the external device. As a result, the user 51 can take a prompt action such as returning to the automobile 99. The image transmitting device 100a may record on the storage device 102 a time when a suspicious person is captured, identification information of an image capturing device that has captured the suspicious person, and so on along with an image including the suspicious person, and provide them immediately in response to an input operation performed by the user. It is to be noted that only when a check result of the checking unit 184 shows that the communicability with the external device is denied, the providing unit 185a may give notice of the occurrence of an abnormal situation in step S26.

(Modification 2)

Hereinafter, an image transmitting device 100b resulting from adding to the image transmitting device 100a a sensing unit that senses approach of a person or the like will be described.

Figure 17:
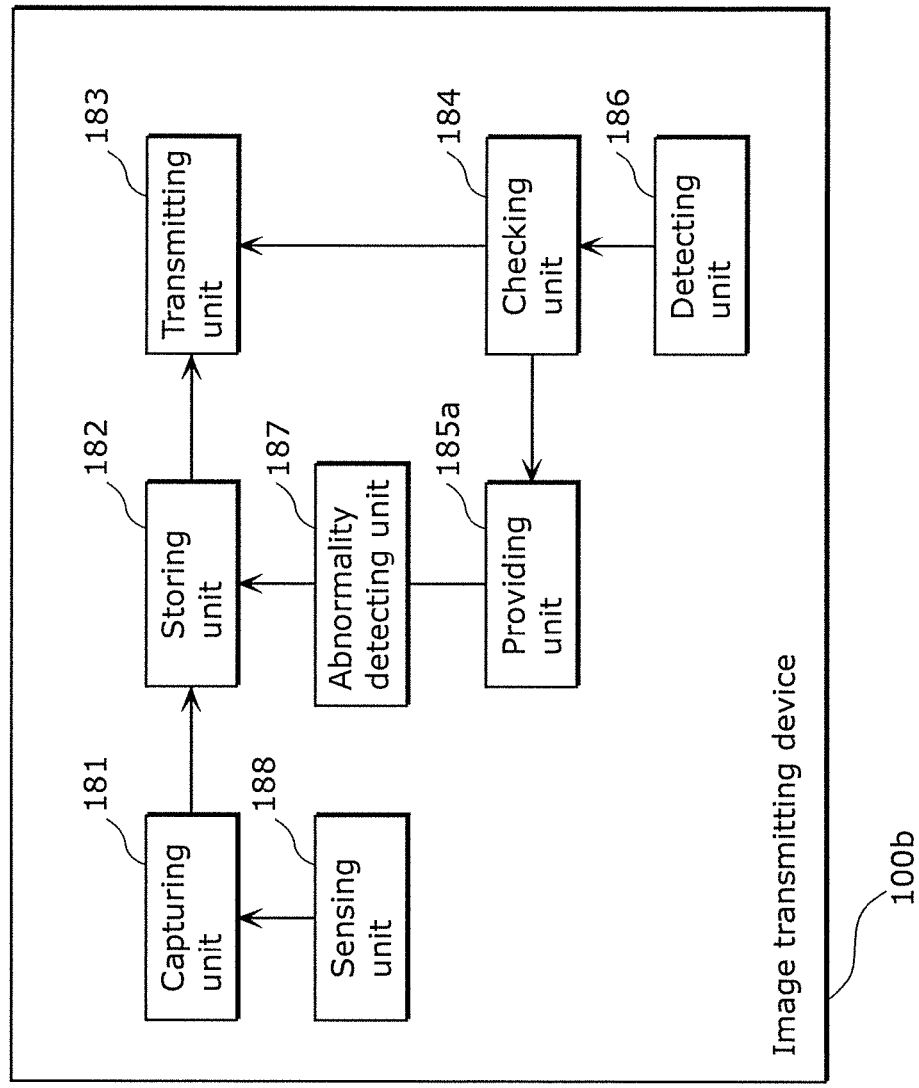
FIG. 17 is a functional block diagram of an image transmitting device according to a modification.

FIG. 17 is a functional block diagram of the image transmitting device 100b.

The image transmitting device 100b includes a sensing unit 188 in addition to the capturing unit 181, the storing unit 182, the transmitting unit 183, the checking unit 184, the providing unit 185a, the detecting unit 186, and the abnormality detecting unit 187 that are the same functional structural elements as those of the image transmitting device 100a. It is to be noted that components (hardware configuration) of the image transmitting device 100b include the same components of the image transmitting device 100 and the image transmitting device 100a, a thermal image sensor 120, and a room lamp 121.

The thermal image sensor 120 is, for instance, a sensor (infrared camera) that has sensitivity in a far infrared range of wavelength of 8 to 12 micrometers and is for capturing an infrared image (thermal image). The thermal image sensor 120 is connected to the controller 107 and the storage device 102. The sensor detects a heat generating body, and thus is capable of detecting a person even when an environment is dark such as nighttime and the underground.

The room lamp 121 is an illuminating device that is connected to the controller 107 and placed to an upper portion of the interior of the automobile 99.

The sensing unit 188, a functional structural element of the image transmitting device 100b, is composed of the thermal image sensor 120, the room light 121, and the controller 107. The sensing unit 188 stores into the storing unit 182 images sequentially captured by the thermal image sensor 120, analyzes the images, lights the room lamp 121 when detecting a person (heat generating body) approaching the automobile 99 for a predetermined time (e.g., one minute) or more, and instructs the capturing unit 181 to perform capturing. It is to be noted that unlike the image transmitting device 100 and the image transmitting device 100*a*, in the image transmitting device 100*b*, the capturing unit 181 does not perform capturing using the image capturing device 101 until the capturing unit 181 receives an instruction to perform capturing from the sensing unit 188.

Figure 19:
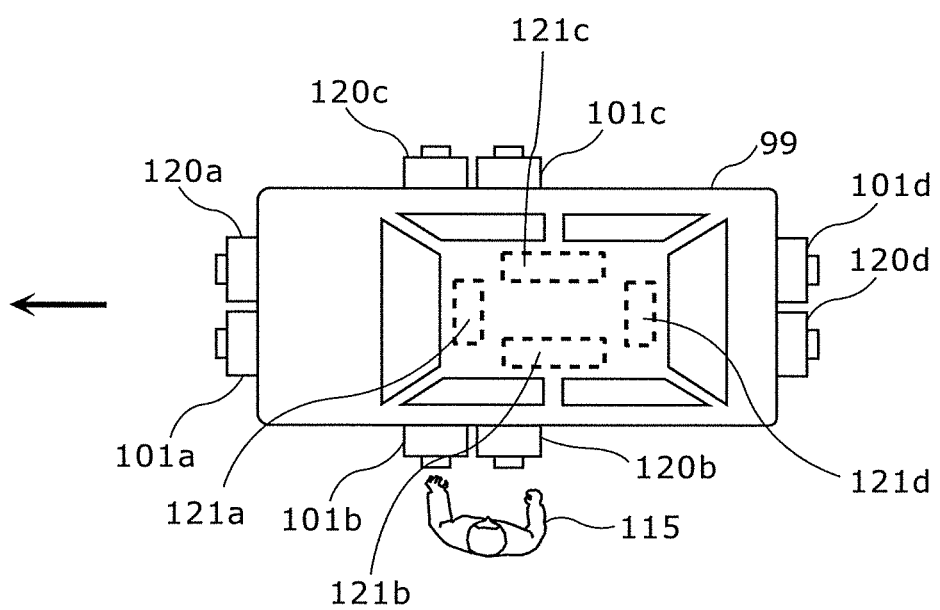
FIG. 19 is a diagram showing exemplary placement of thermal image sensors, image capturing devices, and room lamps to an automobile.

It is to be noted that the numbers of the thermal image sensors 120 and the room lamps 121 are not necessarily limited to one. FIG. 19 is a diagram showing exemplary placement of thermal image sensors, image capturing devices, and room lamps to an automobile. As shown in the figure, thermal image sensors 120*a* to 120*d* and image capturing devices 101*a* to 101*d* are paired respectively and placed to the automobile 99. In other words, the image capturing device 101*a* and the thermal image sensor 120*a* are placed to the front side of the automobile 99. Likewise, the image capturing device 101*b* and the thermal image sensor 120*b* are placed to the left side of the automobile 99, the image capturing device 101*c* and the thermal image sensor 120*c* are placed to the right side of the same, and the image capturing device 101*d* and the thermal image sensor 120*d* are placed to the back side of the same. Moreover, four room lamps 121*a* to 121*d* are placed to the interior of the automobile 99. To put it differently, the room lamp 121*a* is placed to the front side of the interior, the room lamp 121*b* is placed to the left side of the interior, the room lamp 121*c* is placed to the right side of the interior, and the room lamp 121*d* is placed to the back side of the interior.

Hereinafter, an operation performed by the image transmitting device 100*b* having the above-mentioned configuration will be described.

When the detecting unit 186 determines that the automobile 99 has been parked or started after being parked, the image transmitting device 100*b* performs the operation shown in FIG. 5. In this regard, however, not image capturing by the capturing unit 181 but thermal image capturing by the sensing unit 188 (thermal image sensors 120*a* to 120*d*) is started in steps S5 and S9. Subsequently, when the sensing unit 188 senses that thermal images sequentially captured by one of the thermal image sensors 120*a* to 120*d* continuously include a heat generating body for a predetermined time (e.g., one minute) or more, the sensing unit 188 lights a corresponding one of the room lamps 121*a* to 121*d*. Then, a corresponding one of the image capturing device 101*a* to 101*d* is instructed to start to perform capturing. In an example shown in FIG. 19, since the person 115 approaches the left side of the automobile 99, a thermal image captured by the thermal image sensor 120*b* includes the person 115, and accordingly the room lamp 121*b* is lighted and capturing by the image capturing device 101*b* is started. With this, even when the person 115 approaches the automobile 99 in darkness, the thermal image sensor 120*b* is capable of sensing the person 115 (heat generating body), and the image capturing device 101*b* is capable of illuminating the person 115 with the room lamp 121*b* and properly capturing an image including the person 115. When the image capturing device 101*b* is a camera using a CCD, a CMOS sensor, or the like, the image capturing device 101*b* has sensitivity in a wavelength region approximately from 400 to 700 nanometers. As a result, the image capturing device 101*b* is not capable of performing capturing in darkness, but is capable of properly capturing the person 115 if the person 115 is illuminated with the room lamp 121*b*. It is to be noted that as shown in steps S21 to S24 in FIG. 13, the sensing of the inclusion of the heat generating body by the sensing unit 188 can be performed by storing, as a comparative image, a thermal image captured when the automobile 99 is parked and comparing the comparative image and a thermal image captured subsequently. It is also to be noted that a person may be sensed by performing, for example, pattern matching based on a difference between the comparative image and the thermal image captured subsequently.

Such an image transmitting device 100*b* is capable of properly capturing a suspicious person even when the automobile 99 is parked at night, underground, or the like (environment is dark), and of ensuring the security of the parked automobile 99. Moreover, in this case, since the room lamp is lighted only when the suspicious person is detected, it is possible to reduce power consumption (battery power consumption of automobile 99) more than when the room lamp is always lighted. Furthermore, by warning the suspicious person with the lighting of the room lamp, it is possible to increase the possibility of preventing the suspicious person from performing an action such as car break-in (stealing item in an automobile).

It is to be noted that in the image transmitting device 100*b*, when an image captured by the capturing unit 181 is transmitted to the external device, a thermal image captured by the thermal image sensor 120 or the like may be also transmitted. With this, the user can easily know what has been captured. Moreover, when the sensing unit 188 senses that thermal images sequentially captured continuously include a person for a predetermined time or more, the notification of information indicating the occurrence of an abnormal situation in step S26 shown in FIG. 13 may be performed. Furthermore, it may be determined whether a suspicious person is included based on an image captured by an image capturing device after the thermal image sensor senses a heat generating body. In addition, the image capturing device may perform capturing before receiving an instruction to perform capturing from the sensing unit 188.

Moreover, when the sensing unit 188 senses not that thermal images sequentially captured continuously include a heat generating body for a predetermined time or more but that a thermal image simply includes the heat generating body, the sensing unit 188 may light a room lamp and cause the image capturing device to start to perform capturing.

Figure 20:
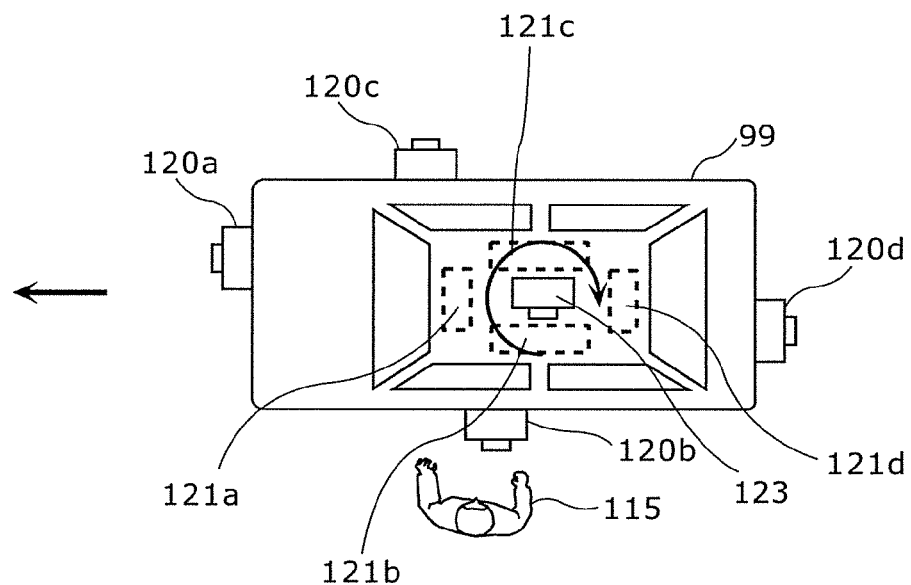
FIG. 20 is a diagram showing exemplary placement of thermal image sensors, image capturing devices, and room lamps to an automobile.

Furthermore, not only the same numbers of the thermal image sensors and the image capturing devices are placed as the pairs as shown in FIG. 19, but also, for instance, the number of the image capturing devices may be reduced by placing a greater number of the thermal image sensors. For example, as shown in FIG. 20, the thermal image sensors 120*a* to 120*d* may be respectively placed to the front, back, left, and right sides of the automobile 99, and a single image capturing device 123 that is rotatable as shown by an arrow in the figure may be placed on a central upper portion of the automobile 99. Then, the thermal image sensors 120*a* to 120*d* may detect a position of a person who approaches the automobile 99, the image capturing device 123 may be rotated or the like to perform capturing in a direction of the position, and an image may be captured. With this, it is possible to reduce the number of the image capturing devices, and thus to configure the image transmitting device inexpensively.

(Embodiment 2)

Hereinafter, Embodiment 2, one aspect of the present invention, will be described. A vehicle security system according to Embodiment 2 has the same device configuration as the vehicle security system 10 according to Embodiment 1 (refer to FIG. 1). For this reason, the same elements or the like as those of Embodiment 1 are referred to using the same reference signs. In Embodiment 2, however, the automobile 99 includes an image transmitting device 200 instead of the image transmitting device 100. Unlike the image transmitting device 100, the image transmitting device 200 checks communicability with an external device at a parking place before the automobile 99 is parked.
(Configuration)

Hereinafter, a configuration of the image transmitting device 200 will be described.

Figure 21:
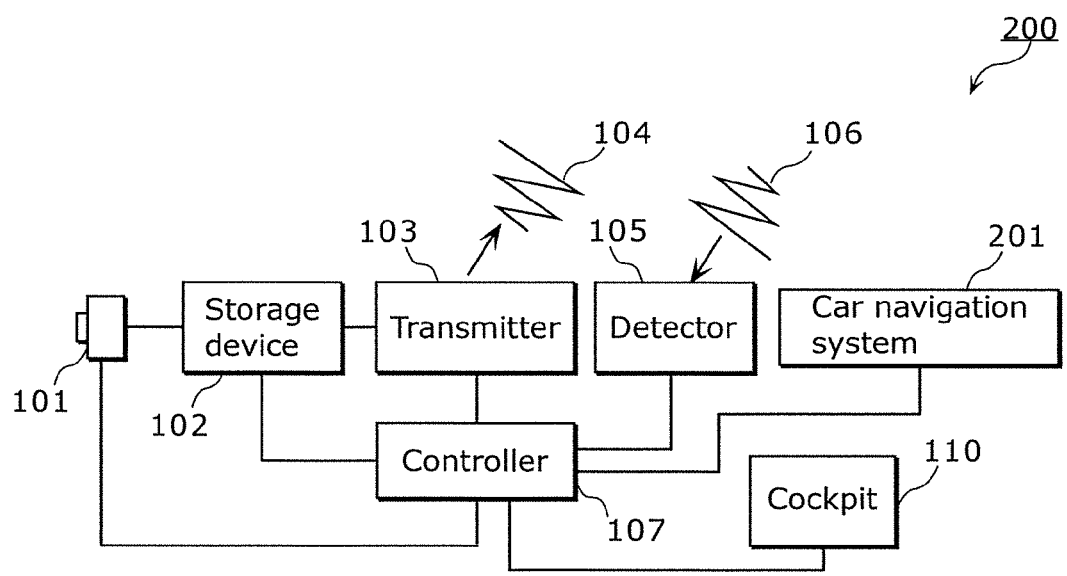
FIG. 21 is a schematic block diagram of an image transmitting device according to Embodiment 2.

FIG. 21 is a schematic block diagram of the image transmitting device 200. The image transmitting device 200 includes a car navigation system 201 as a component (hardware configuration) in addition to the same components (image capturing device 101, storage device 102, transmitter 103, detector 105, controller 107 and cockpit 110) as those of the image transmitting device 100. Moreover, the image transmitting device 200 may operate with power from a battery of the automobile 99, for example, and include an interface with a control system (system that detects an engine stop of an automobile and outputs a status of the automobile) of the automobile 99, for instance. Although the single image capturing device 101 is shown in FIG. 2, the number and placement of the image capturing devices 101 may be changed. For example, like the image capturing devices 101*a* to 101*d* shown in FIG. 3, some of the image capturing devices 101 may be placed to the front, back, left, and right sides of the automobile 99.

The car navigation system 201 includes, for instance, a processor, a memory, a GPS receiver, a display, and a touch panel attached to the surface of the display. The car navigation system 201 receives an input of a travel destination for the automobile 99 from a user (driver) and displays, for example, a traveling route to the destination on a map. The car navigation system 201 transmits the inputted destination to the controller 107 in response to control by the controller 107.

Figure 22:
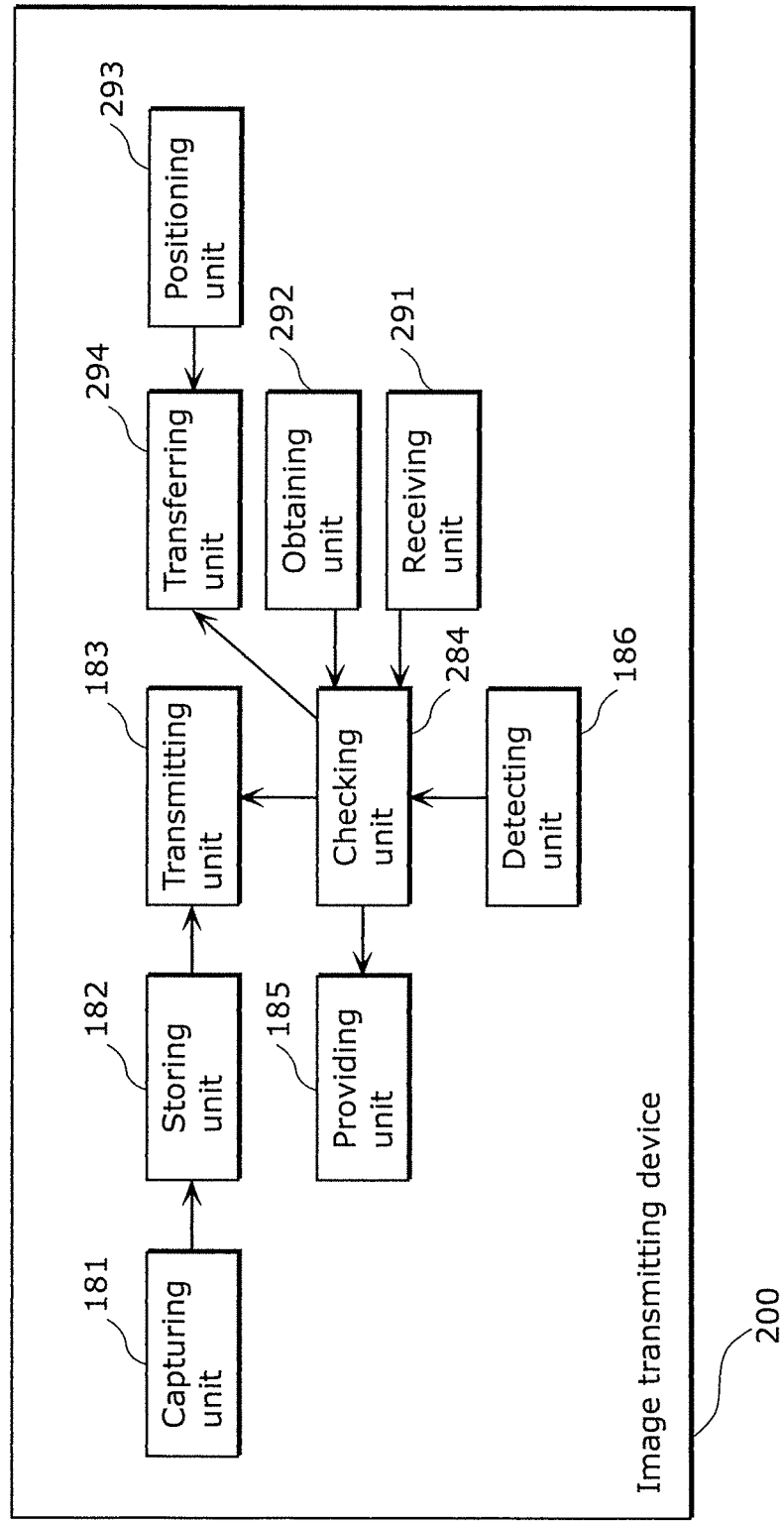
FIG. 22 is a functional block diagram of an image transmitting device.

FIG. 22 is a functional block diagram of the image transmitting device 200.

The image transmitting device 200 having the above-mentioned configuration includes the capturing unit 181, the storing unit 182, the transmitting unit 183, the providing unit 185, the detecting unit 186, a checking unit 284, a receiving unit 291, an obtaining unit 292, a positioning unit 293, and a transferring unit 294 in terms of a functional aspect, that is, as functional structural elements. It is to be noted that functions of the capturing unit 181, the storing unit 182, the transmitting unit 183, the providing unit 185, and the detecting unit 186 are the same as those in the image transmitting device 100.

Figure 23:
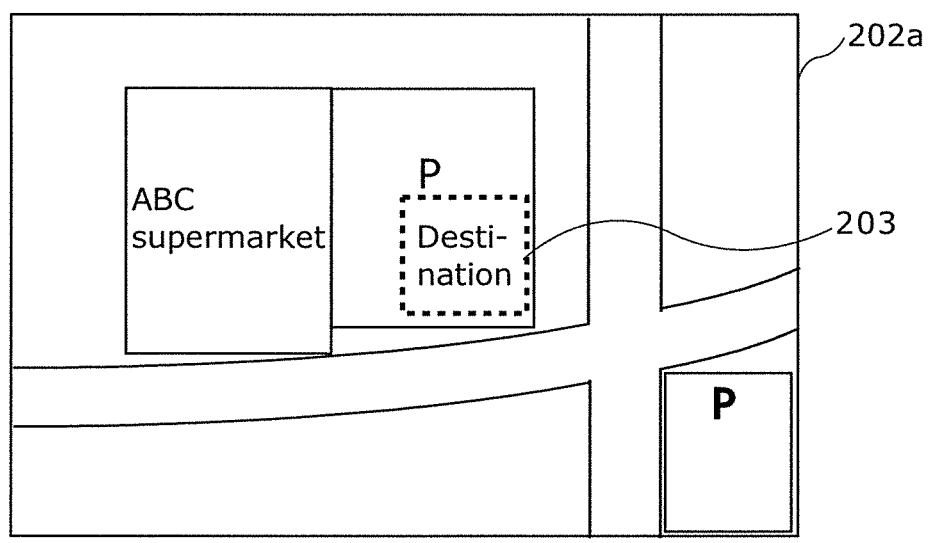
FIG. 23 is a diagram showing an exemplary display screen of a car navigation system.

The receiving unit 291 is composed of a user interface (touch panel) or the like of the car navigation system 201 and the controller 107, and has a function to receive an input of a position of a parking place as a destination of the automobile 99, that is, a planned arrival place, which is made by the user (driver). The user can input the destination by, for instance, touching a portion of a map displayed on a display (touch panel) by the car navigation system 201. FIG. 23 shows an exemplary input. The figure shows a state where a portion of a map shown on a screen 202*a* displayed on the display of the car navigation system 201 and touched by the user is received as a destination 203 and is shown as a dashed rectangle. It is to be noted that the input of destination may be performed using other methods, and may be performed by moving a cursor displayed on a map through a button operation or the like, for example. In addition, the designation of destination may be performed by, for instance, an input (e.g., input of longitude and latitude) through a keyboard or the like without depending on the car navigation system 201.

The obtaining unit 292 is composed of the detector 105 (communication circuit) and the controller 107, and has a function to obtain communicability position information via a base station from a specific server device in the network 11. It is to be noted that the detector 105 not only measures electric field intensity of a reception signal but also demodulates the reception signal as information. The communicability position information is information indicating, for each of positions, communicability with an external device at the position, and indicates which parking place of an automobile allows an image captured by the capturing unit 181 to be stably transmitted to the external device. The communicability position information may indicate reception electric field intensity (reception level) at each position, for instance. Here, a description is given assuming that the specific server device is the server device 20 (refer to FIG. 1).

The checking unit 284 is composed of the detector 105 and the controller 107. Like the checking unit 184 in the image transmitting device 100, the checking unit 284 performs a checking process for checking communicability with the external device by measuring reception electric field intensity of the detection waves 106. The checking unit 284 has a function to transmit information indicating a check result to the providing unit 185, the transmitting unit 183, and the transferring unit 294. Furthermore, in a period from when the receiving unit 291 received an input of a destination to when the automobile has not arrived at the destination, the checking unit 284 has a function to check communicability with the external device at the destination based not on measurement of reception electric field intensity but on communicability position information obtained by the obtaining unit 292.

The positioning unit 293 is composed of the GPS receiver or the like of the car navigation system 201 and the controller 107, and has a function to measure a current position of the automobile 99 and transmit the current position to the transferring unit 294.

The transferring unit 294 is composed of the transmitter 103 (communication circuit) and the controller 107, and has a function to transmit to the server device 20 a check (examination) result of communicability with the external device obtained by measuring reception electric field intensity and received from the checking unit 284, and a position of the automobile 99 received from the positioning unit 293.

It is to be noted that the providing unit 185 is composed of the cockpit 110, the display of the car navigation system 201, and the controller 107, and has a function to display content according to a check result transmitted by the checking unit 184, on the cockpit 110 and the display.
(Operation)

When the detecting unit 186 determines that the automobile 99 has been parked or started after being parked, the image transmitting device 200 having the above configuration performs the operation shown in FIG. 5, like the image transmitting device 100.

It is to be noted that the transferring unit 294 may transmit to the server device 20 a check result based on measurement of reception electric field intensity by the checking unit 284 in step S2 shown in FIG. 5, together with a position measured by the positioning unit 293. It is to be noted that this transmission may be performed when the server device 20 becomes communicable, and as long as a check result to be transmitted is information indicating communicability with an external device, the check result to be transmitted may be reception electric field intensity (reception level) of detection waves, for instance. Moreover, the checking unit 284 may examine the communicability with the external device based on measurement of reception electric field intensity, while the automobile 99 is traveling. Then, the providing unit 185 may display the check result, that is, the reception level, a position (candidate parking place) where communication with the external device is possible, and so on, on the cockpit 110 or the like. With this, the user (driver) can select a place where the check result is satisfactory, before parking the automobile. Moreover, the transferring unit 294 may transmit the check result and the position measured by the positioning unit 293 to the server device 20 at a time when the server device 20 is communicable, while the automobile is traveling. With this, the server device 20 is capable of collecting the information indicating the communicability with the external device at each position, from each of vehicles such as the automobile 99 including the image transmitting device 200, and accumulating the above-mentioned communicability position information. Then, the server device 20 transmits the communicability position information in response to a request from the image transmitting device 200 or the like. It is to be noted that communicability position information that is held and can be transmitted by the server device 20 may be generated by a method other than a method for collecting information from a vehicle.

Figure 24:
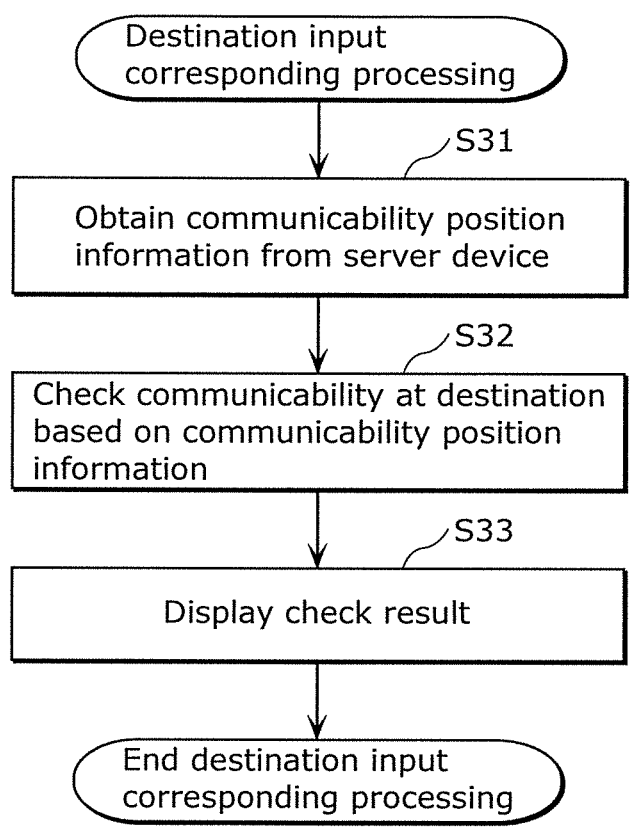
FIG. 24 is a flow chart showing destination input corresponding processing in an image transmitting device.

Furthermore, when the receiving unit 291 receives an input of a destination by the user, the image transmitting device 200 performs destination input corresponding processing shown in FIG. 24.

FIG. 24 is a flow chart showing destination input corresponding processing in the image transmitting device 200. Hereinafter, the destination input corresponding processing will be described in line with the figure.

The obtaining unit 292 obtains from the server device 20 communicability position information about an area including a destination of which the input is received by the receiving unit 291 (step S31). This obtainment of communicability position information is performed by the image transmitting device 200 communicating with the server device 20 via a base station or the like. When the image transmitting device 200 is incapable of communicating with the server device 20, communicability position information is obtained after the communication is made possible by traveling (movement) of the automobile 99. It is to be noted that before the receiving unit 291 receives the input of the destination, the obtaining unit 292 may obtain communicability position information about a broad area when the image transmitting device 200 is capable of communicating with the server device 20.

Figure 25:
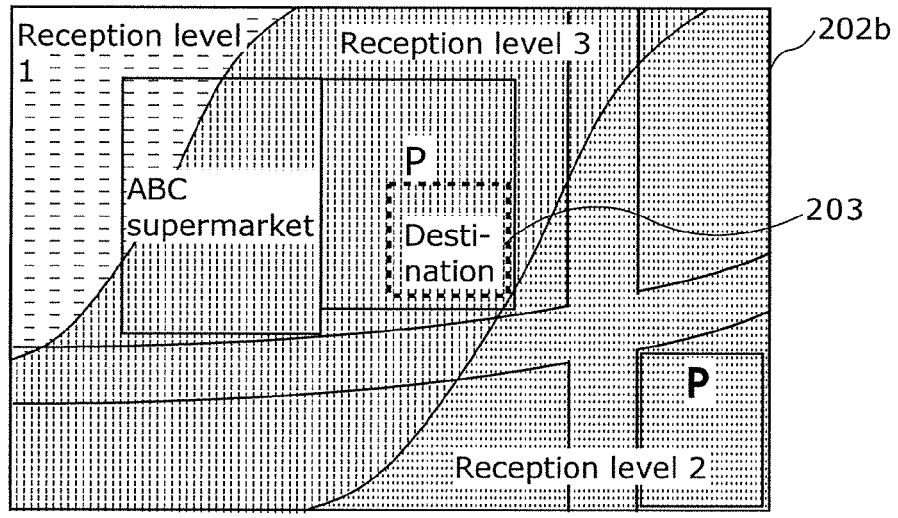
FIG. 25 is a diagram showing an exemplary display screen of a car navigation system.

Subsequently, the checking unit 284 checks communicability with an external device at the destination of which the input is received by the receiving unit 291, based on the communicability position information obtained by the obtaining unit 292 (step S32). In response to transmission of a check result by the checking unit 284, the providing unit 185 displays information about the communicability with the external device at the destination (parking place at which the automobile 99 is expected to arrive), on the cockpit 110 or the display of the car navigation system 201 (step S33). FIG. 8 shows an exemplary display on the cockpit 110. Moreover, FIG. 25 shows an exemplary display on the display of the car navigation system 201. A screen 202b illustrated by FIG. 25 shows a map in which a denser concentration pattern is superimposed on a place having higher communicability with an external device to display electric field intensity (reception level) of a signal from the external device. The screen 202b shows that a reception level at a destination 203 corresponds to 3 among the divided stages 0 to 3. It is to be noted that a reception level or the like at each position on the map can be estimated by calculation such as interpolation based on communicability position information. When the automobile approaches a place at a certain distance or less from the destination, the providing unit 185 may provide a reception level or the like using voice. For instance, voice such as "Currently Reception Level 3" may be emitted from a speaker in the automobile, or a reception level may be provided by changing a tone of beep. With this, the user can recognize the reception level without transferring the user's gaze to the cockpit 110 while driving, and thus convenience for the user is enhanced. It is to be noted that the receiving sensitivity information 111 (refer to FIG. 8) may be always displayed or may be displayed only when the automobile approaches a place at a certain distance or less from the destination (when the automobile is at a position within a predetermined distance range from the destination). Alternatively, the receiving sensitivity information 111 is always displayed, and highlighting such as enlarging may be performed when the automobile approaches a place at a certain distance or less from the destination.

According to such an image transmitting device 200, the user (driver) can confirm whether the security of the automobile 99 to be parked at the destination where the automobile 99 is to arrive is sufficiently ensured before arriving at the destination (parking place). In other words, the user who will leave the automobile 99 after parking it at the destination can confirm in advance whether the user can receive, with the mobile terminal, an image to be captured by the image capturing device 101 via the external device, and check the image.

Thus, when it is confirmed that the security cannot be sufficiently ensured, the user can change the destination to, for example, another neighboring parking place before arriving at the destination. An exemplary operation of changing a destination will be described using FIG. 26 and FIG. 27.

Figure 26:
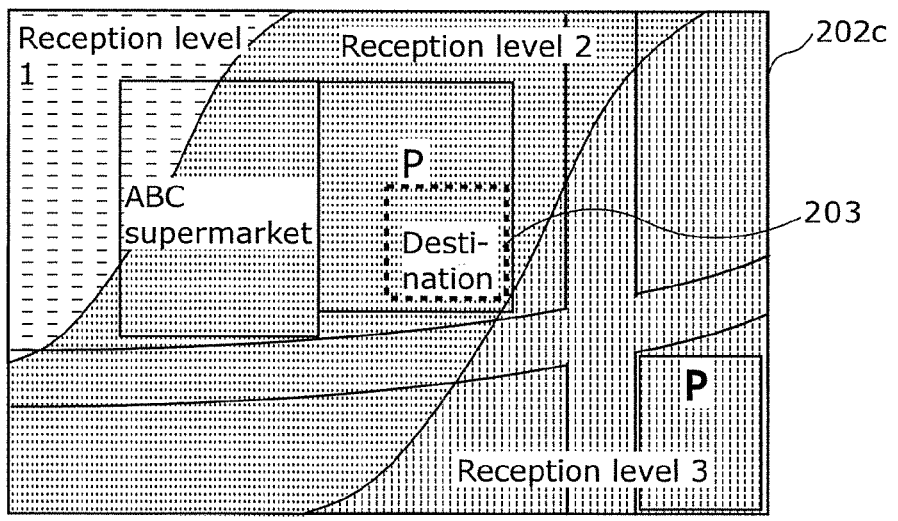
FIG. 26 is a diagram showing an exemplary display screen of a car navigation system.
Figure 27:
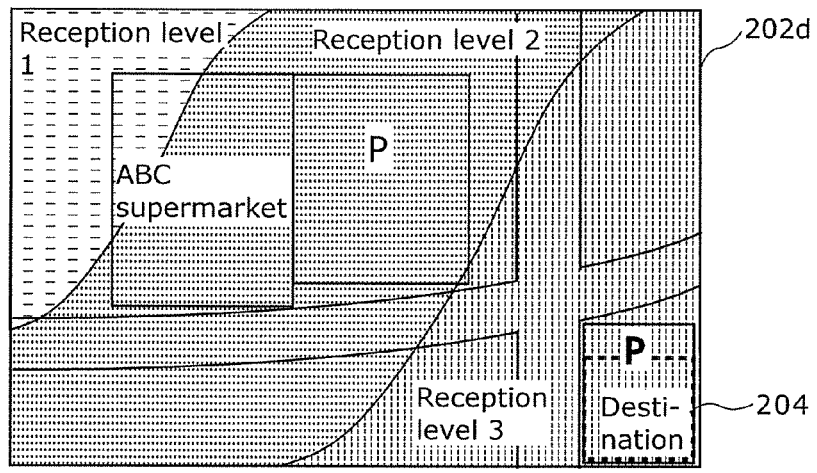
FIG. 27 is a diagram showing an exemplary display screen of a car navigation system.

First, the user has designated as a destination a parking place closest to the super market "ABC super." In view of this, FIG. 26 shows a screen 202c displayed on the display of the car navigation system 201 when a reception level of the destination is not highest. In such a case, the user can change the destination by, for example, touching another place on the map. For instance, the user performs a destination change operation to designate another parking place close to the "ABC super" as a destination. FIG. 27 shows a state where the destination is changed. The figure shows a screen 202d in a state where the user touches another parking place having reception level 3 to designate it as a destination 204. It is to be noted that when the destination 204 is designated, the car navigation system 201 performs route display or the like while the automobile 99 is traveling, to guide the automobile 99 to the destination.

It is to be noted that when a destination inputted by the user is a place where the communicability with the external device is not sufficiently high, the image transmitting device 200 may search for a parking place which is within a certain distance from the destination and where the communicability is sufficiently high, and display the parking place as a destination candidate on the display. Such searching for a destination candidate (alternative destination) is performed based on neighborhood map information and communicability position information. It is to be noted when the map information includes, for instance, information about a facility such as "ABC super" and its affiliated parking places, at a time of the searching, a parking place closest to the destination among the affiliated parking places of the facility may be searched for and displayed as a destination candidate (parking place candidate).

(Embodiment 3)

Hereinafter, Embodiment 3, one aspect of the present invention, will be described. In Embodiment 3, an example will be described where the image transmitting device 100 described in Embodiment 1 is modified and images captured by the image capturing devices 101a to 101d are used.

Here, a device (modified image transmitting device) obtained by modifying the image transmitting device 100 including the image capturing devices 101a to 101d (refer to FIG. 3) and described in Embodiment 1 will be described. It is to be noted that the modified image transmitting device is the same as the image transmitting device 100 except for points to be described below. In other words, the modified image transmitting device includes components (hardware configuration) such as the image capturing devices 101a to 101d, the storage device 102, the transmitter 103, the detector 105, the controller 107, and the cockpit 110.

The modified image transmitting device is mounted on the automobile 99, and the image capturing devices 101a to 101d are placed to the front, back, left, and right sides of the automobile 99. While the automobile 99 is traveling, the modified image transmitting device transmits, using the transmitter 103, images captured by cameras (image capturing devices 101a to 101d) directed toward the outside of the automobile 99. The images transmitted by the modified image transmitting device are forwarded to, for instance, a web server (e.g., server device 20) connected to the network 11 via a base station, and are disclosed on the Internet. With this, the public or a specific person can browse the images (video) sequentially captured while the automobile 99 is traveling.

For example, when the user (driver) drives the automobile to an acquaintance's home, there is a case where the user almost reaches the acquaintance's home but gets lost or a case where the user needs to take a detour due to unexpected construction work or the like. In either case, the acquaintance can immediately know a position and a situation of the driver by checking images disclosed on the Internet with a smart phone, a computer, or the like via the Internet, and thus appropriately show the driver the way.

Figure 28:
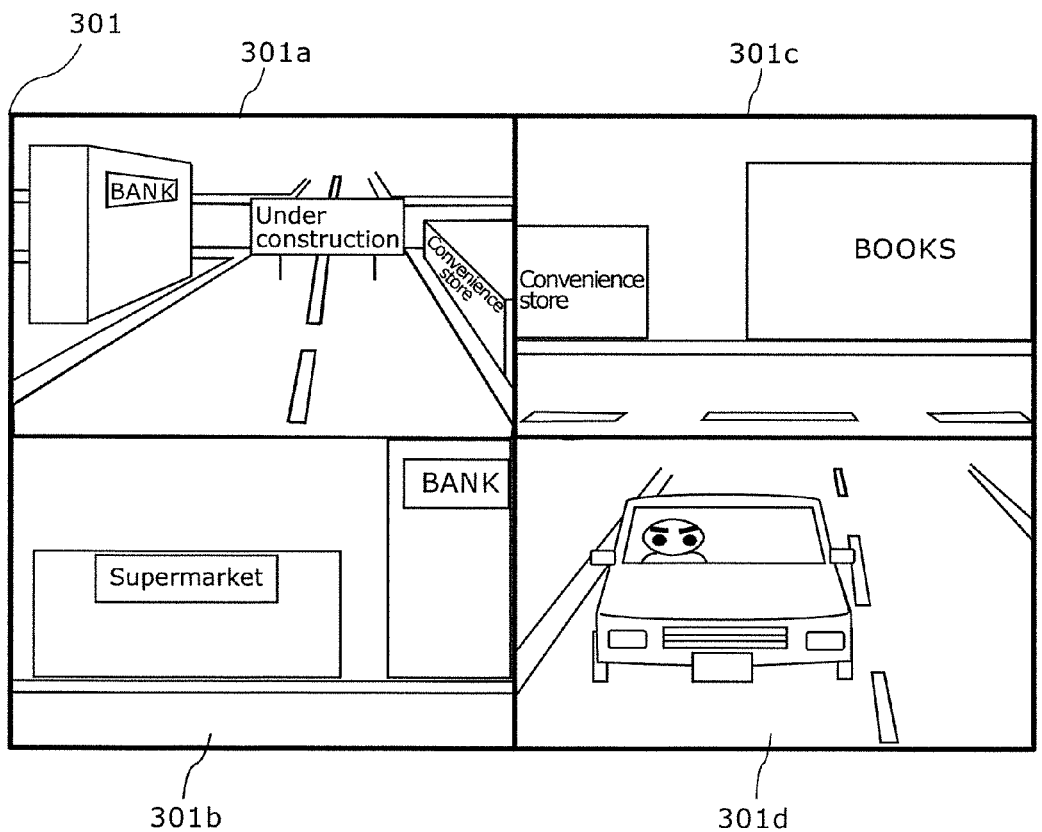
FIG. 28 is a diagram showing exemplary images captured by image capturing devices and disclosed.

FIG. 28 shows exemplary images captured by the image capturing devices 101a to 101d and disclosed on the Internet. A screen 301 shown in the figure is a screen of a web page, and displays videos 301a to 301d in respective four divided regions. The video 301a includes images sequentially captured by the image capturing device 101a, and similarly the videos 301b, 301c, and 301d include corresponding images sequentially captured by the respective image capturing devices 101b, 101c, and 101d.

The acquaintance can recognize a position of the driver by understanding, based on these videos 301a to 301d, surrounding building information (bank (BANK) ahead of the automobile 99 on the left, a supermarket on the left of the automobile 99, a convenience store ahead of the automobile 99 on the right, a bookstore (BOOKS) on the right of the automobile 99, and so on) for the traveling automobile 99. Moreover, the acquaintance can instantly know that there is construction work ahead of the automobile 99, and promptly inform the driver of a detour. Furthermore, voice that is a conversation between the driver and the acquaintance can be transmitted as communication content by the communication circuit included in the image transmitting device 100. With this, the acquaintance can recognize the same information as when the acquaintance is in the vehicle 99, and have a proper conversation (communication) with the driver. It is to be noted that the number and placement of the image capturing devices may be arbitrary.

The images captured by the image capturing devices 101a to 101d and disclosed on the Internet may be stored in a server (e.g., server device 20) or the like. With this, even when the automobile 99 gets into an accident, it is possible to check afterward in what situation the accident occurred, a license plate of an automobile that caused the accident, and so on.

(Embodiment 4)

Hereinafter, Embodiment 4, one aspect of the present invention, will be described. In Embodiment 4, an example will be described where the image transmitting device 100b shown as Modification 2 of Embodiment 2 and including the image capturing device and the thermal image sensor is modified, and the image capturing device 101a and the thermal image sensor 120a are placed to the front side of the automobile 99.

Figure 18:
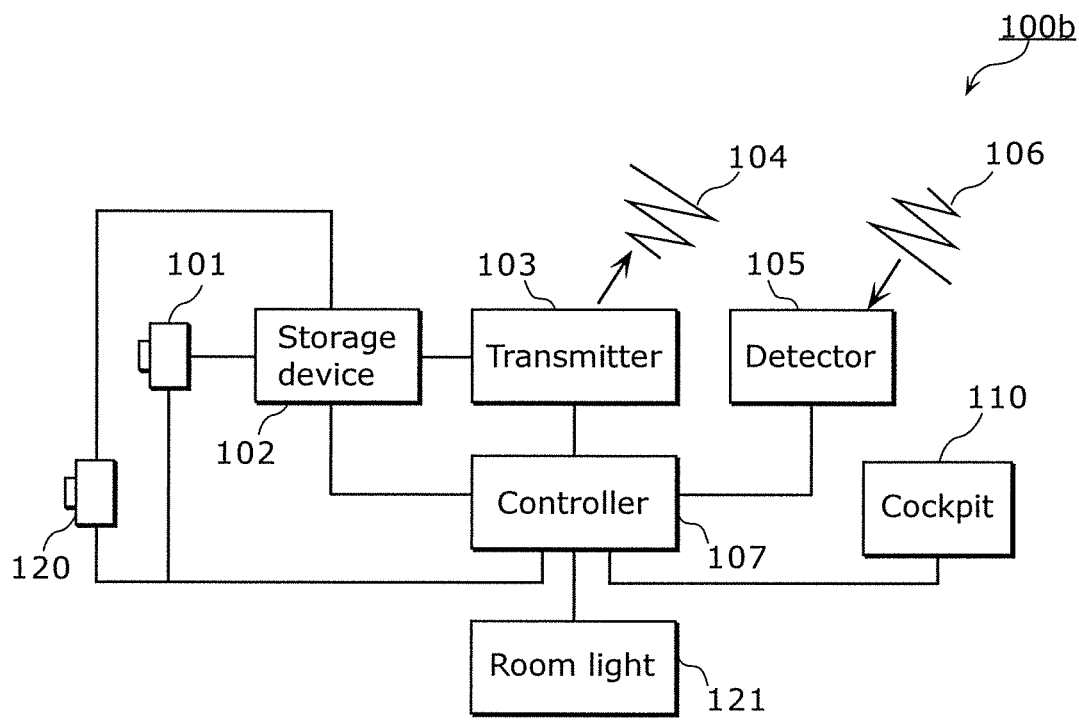
FIG. 18 is a schematic diagram of an image transmitting device according to a modification.
Figure 29:
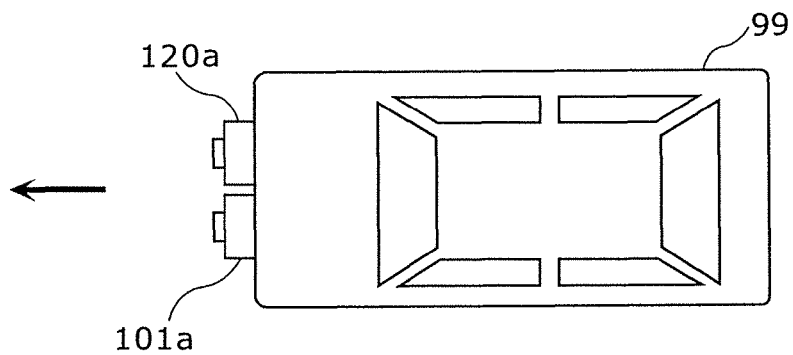
FIG. 29 is a diagram showing exemplary placement of a thermal image sensor and an image capturing device to an automobile.

Here, a device (second modified image transmitting device) obtained by modifying the image transmitting device 100b (refer to FIG. 19) shown in Modification 2 of Embodiment 1 will be described. It is to be noted that the second modified image transmitting device is the same as the image transmitting device 100b except for points to be described below. In other words, the second modified image transmitting device includes components such as the image capturing device 101a, the storage device 102, the transmitter 103, the detector 105, the controller 107, the cockpit 110, the thermal image sensor 120a, and the room lamp 121 (refer to FIG. 18 and FIG. 19). It is to be noted that the room lamp 121 may not be included. The second modified image transmitting device is mounted on the automobile 99, and the image capturing device 101a and the thermal image sensor 120a are placed to the front side of the automobile 99. FIG. 29 is a diagram showing exemplary placement of the thermal image sensor 120a and the image capturing device 101a to the automobile 99.

While the automobile 99 is traveling, the second modified image transmitting device sequentially captures images using the image capturing device 101a and the thermal image sensor 120a directed toward the outside of the automobile 99, adds a road surface condition ahead of the automobile 99 to temperature information based on the images, and notifies the user (driver) of the temperature information.

Figure 30:
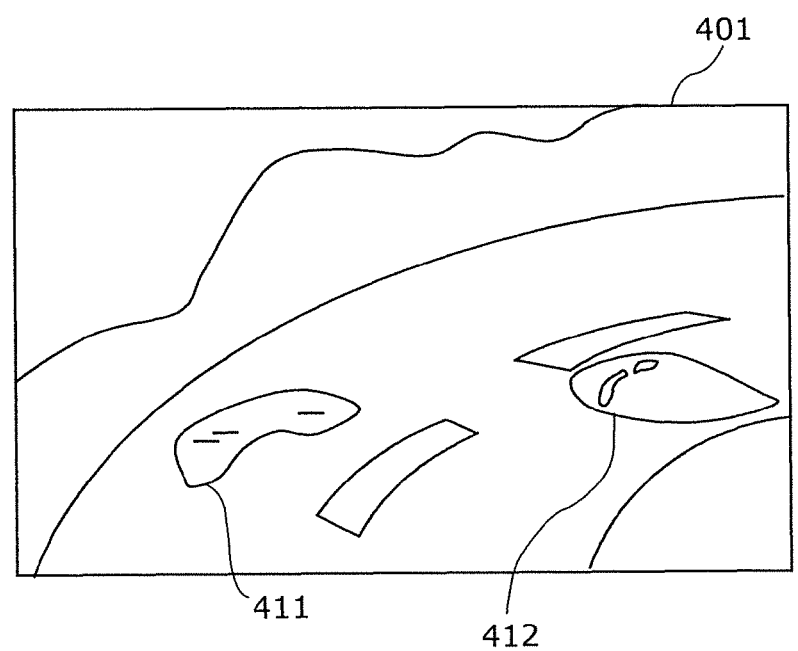
FIG. 30 is a diagram showing an exemplary image of a road surface captured by an image capturing device.
Figure 31:
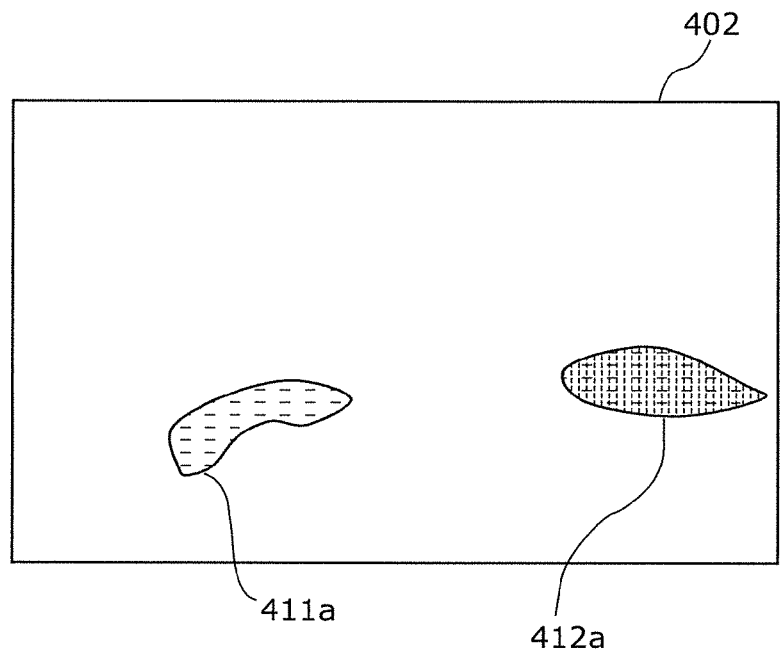
FIG. 31 is a diagram showing an exemplary thermal image of a road surface captured by a thermal image sensor.
Figure 32:
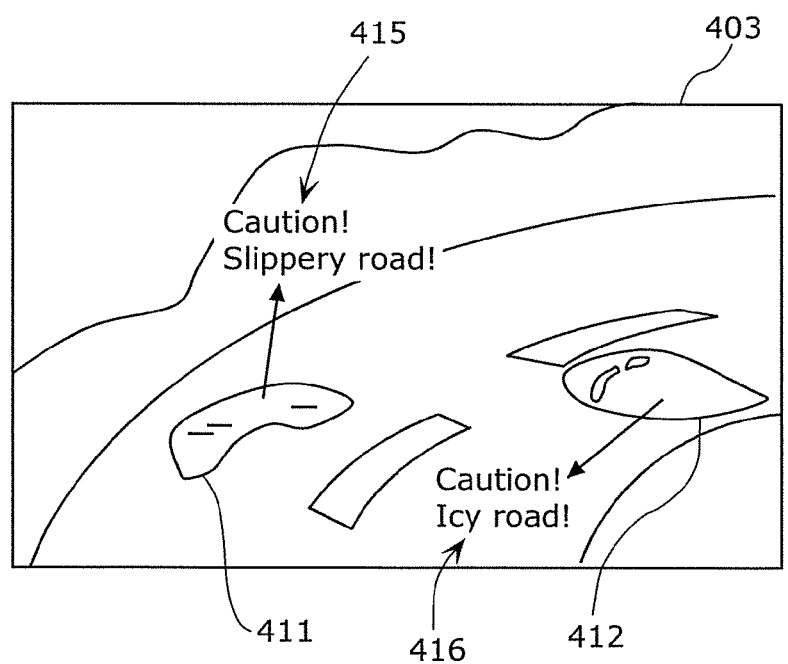
FIG. 32 is a diagram showing exemplary display of a road surface condition.

When the image capturing device 101a is a camera using a CCD sensor, a CMOS sensor, or the like and has sensitivity in at least part of a wavelength from 400 to 700 nanometers, an image of a scene ahead of the automobile 99 captured by the image capturing device 101a is an image 401 shown in FIG. 30, for instance. The image 401 of a road ahead of the traveling automobile 99 includes a puddle 411 and ice 412. Unfortunately, it is not easy to discern the puddle 411 and the ice 412 that are translucent, based on the image. The thermal image sensor 120a, however, captures a temperature distribution as an image. An image of a scene ahead of the automobile 99 captured by the thermal image sensor 120a is an image 402 shown in FIG. 31, for example. The image 402 of a road includes a portion 411a having lower temperature than surroundings and a portion 412a having much lower temperature than the surroundings. Since the temperature of a puddle portion is lower than a portion of a dry road and the temperature of an icy portion is much lower than the portion of the dry road, the portion 411a corresponding to the puddle and the portion 412a corresponding to the ice are discerned based on the image 402. The second modified image transmitting device generates an image 403 shown in FIG. 32 based on the both images, for instance, and displays the generated image on the cockpit 110 or the like. In a reflection of an analysis result of the image 402 based on temperature, the image 403 includes a warning display 415 that is "Caution! Slippery road!" indicating the puddle 411, and a warning display 416 that is "Caution! Icy road!" indicating the ice 412. With this, the user (driver) can properly understand a road surface condition that is difficult to judge with the naked eye (road surface condition including translucent puddle or ice that is difficult to visually identify), by looking at the displayed image 403.

The second modified image transmitting device may further measure a position of the automobile 99 using the GPS receiver or the like, and transmit, to a server in a network, the position together with images captured by the image capturing device 101a and the thermal image sensor 120a and an image generated based on these images (e.g., images 401 to 403). The server is the server device 20, for example. The server device 20 may create a web page or the like based on an image collected from each vehicle and corresponding to each position, disclose the web page on the Internet, and distribute information based on the image. With this, another person can know the position of the automobile 99 or a road surface condition at a position of each vehicle from a remote location. With this, since an actual road surface condition that a fixed point camera has difficulty capturing is captured and put into public use, a road surface condition of each place can be checked from a remote location, and an icy condition of, weather over, or the like of a road to ski slopes can be checked in advance, for instance. Moreover, a dangerous place can be identified by collecting and analyzing captured images, and thus early measures against danger can be taken. It is to be noted that a sensing unit that senses that a braking operation of the automobile 99 has been performed may be provided to the second modified image transmitting device, and when the sensing unit senses the braking operation, the image capturing device 101a and the thermal image sensor 120a may perform capturing. With this, capturing can be efficiently performed in a situation where caution is required when a vehicle is driven, and useful information calling for attention can be disclosed on the Internet.

It is to be noted that the second modified image transmitting device may disclose, on the Internet or the like, a current position of the automobile 99, a destination, and a traveling route to the destination, based on information of a car navigation system mounted on the automobile 99, for instance. With this, a pedestrian who is near the traveling route of the automobile 99 and is heading to a place near the destination of the automobile 99 can ask the automobile 99 for a ride via the Internet. As described above, fuel consumed to transport people and cargo can be saved by the information transmission of the second modified image transmitting device, and the enhancement of convenience as well as the saving of energy can be achieved.

(Other Embodiments)

Although the embodiments each describing an image transmitting device have been described above, each embodiment is a mere example, and it goes without saying that various modifications can be made to the embodiment.

Figure 33:
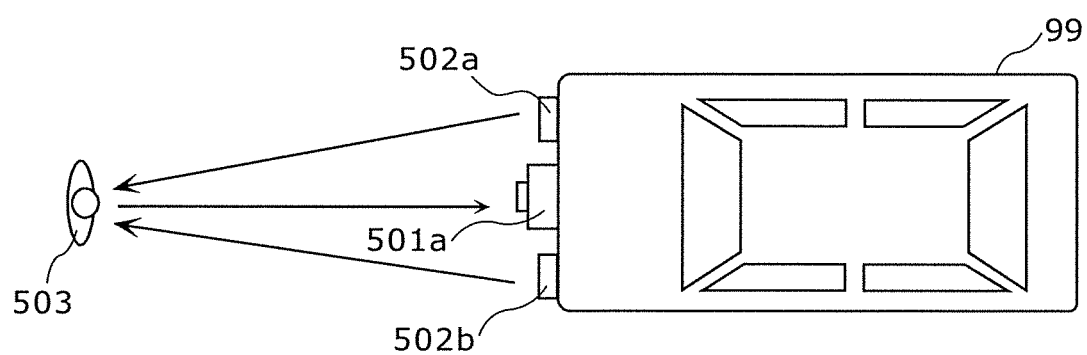
FIG. 33 is a diagram showing exemplary placement of an image capturing device and headlights to an automobile.

For instance, although the example has been described (refer to FIG. 3 and FIG. 29) where the image capturing device 101a is placed to capture a scene ahead of the automobile 99, the following may be possible to illuminate the scene with headlights in darkness and capture a bright image. FIG. 33 is a diagram showing an example where an image capturing device 501a and headlights 502a and 502b are placed to the automobile 99. The automobile 99 shown in FIG. 33 has a front face to which the image capturing device 501a and the headlights 502a and 502b are placed. In this configuration, a laser light source is used as a light source of the headlights 502a and 502b, and is a wavelength converting laser that performs wavelength conversion from laser light in a near-infrared range to laser light in a visible range. For example, a semiconductor laser having a wavelength of 1064 nanometers is used for the laser light in the near-infrared range, and is a second harmonic generator (SHG) laser that passes the laser light in the near-infrared range through a wavelength converting element such as lithium niobate crystal, to convert the laser light in the near-infrared range into a green light having a wavelength of 532 nanometers. Moreover, the image capturing device 501a has sensitivity in a wavelength region of 1064 nanometers. In general, the wavelength converting laser such as the SHG laser does not convert a laser light having a long wavelength into a laser light having a 100% short wavelength, and normally emits the laser light having the long wavelength together with a laser light having a short wavelength resulting from approximately 50% wavelength conversion. Thus, the headlights 502a and 502b generate both the laser light of 1064 nanometers and the laser light of 532 nanometers. In doing so, the scene ahead of the automobile 99 can be illuminated with the far-red light having the wavelength of 1064 nanometers and the light having the wavelength of 532 nanometers emitted by the headlights 502a and 502b, and be captured. For instance, when a person 503 shown in FIG. 33 is ahead of the automobile 99, the image capturing device 501a has sensitivity for 1064 nanometers, and thus can capture a bright image without illuminating the person 503 with extra brightness as the headlights. Here, an illuminating light that makes the scene ahead of the automobile 99 directly viewable may be used as a wide spectrum light resulting from illuminating a fluorescent body with the laser light having the wavelength of 532 nanometers. At this time, a third harmonic generator (THG) laser for the light having the wavelength of 1064 nanometers may make, as a blue light, a light having a wavelength of 355 nanometers enter the fluorescent body. With this, although white headlights are originally a single laser light source, the white headlights having a spectrum in a full visible range can be formed. It is to be noted that although the wavelength conversion from the laser light having the wavelength of 1064 nanometers to the light having the wavelength of 532 nanometers or the wavelength of 355 nanometers has been described as an example, the present invention is not limited to this as long as a wavelength of the light is a wavelength in which the image capturing device 501a has sensitivity.

Moreover, the checking unit 184 of the image transmitting device checks the communicability with the external device by measuring the reception electric field intensity of the detection waves 106 when the automobile 99 is parked. The checking unit 184 may check the communicability with the external device by, instead of measuring the reception electric field intensity, causing the transmitting unit 183 to attempt to transmit an image captured by the capturing unit 181 and confirming, through communication with the external device, that the image is received by the external device. For example, the transmitting unit 183 may transmit an image to the server device 20, upon successfully receiving the image, the server device 20 may transmit a notice of the successful reception to the image transmitting device 100, and the image transmitting device 100 may determine that the communicability with the external device is confirmed, based on the reception of the notice of the successful reception. Furthermore, the transmitting unit 183 may attempt to transmit an image to the mobile terminal 50 of the user through the base station or the like, and upon successfully receiving the image, the mobile terminal 50 may transmit a notice of the successful reception to the image transmitting device 100. Also in this case, the image transmitting device 100 is capable of determining that the communicability with the external device is confirmed, based on the reception of the notice of the successful reception.

Moreover, the checking unit 184 of the image transmitting device may check the communicability with the external device by measuring the reception electric field intensity of the detection waves while the automobile 99 is not parked (is traveling or the like). A result of the checking and a position of the automobile 99 may be stored in association with each other, and in the case where a result of checking the communicability with the external device when the automobile 99 is parked is negative, the providing unit 185 may provide a position which is within a predetermined distance range from a parking place and where the communication with the external device is possible, based on the result of checking. Furthermore, the providing unit 185 may display, for instance, a result of checking the communicability with the external device as shown in FIG. 8 while the automobile 99 is traveling or the like. Moreover, regarding transmission of images captured by the image capturing device and the thermal image sensor to the external device, when a check result of the checking unit 184 shows that the communicability with the external device is denied, the transmitting unit 183 may suspend the transmission of the images. Subsequently, in the case where a check result of the checking unit 184 when the automobile 99 is parked or while the automobile 99 is traveling shows that the communicability with the external device is confirmed, the transmission of the images may be performed.

Moreover, the checking unit 284 of the image transmitting device may check the communicability with the external device based on communicability position information obtained before the automobile 99 is parked, without checking the communicability with the external device depending on measurement of the reception electric field intensity of the detection waves 106.

Although the example where the image transmitting device is mounted on the automobile 99 has been described in each of the embodiments, the image transmitting device may be mounted on a vehicle (e.g., motorcycle and bicycle) other than the automobile. It is to be noted that it may be determined whether a bicycle is parked, for instance, based on an orientation of a kickstand of the bicycle or by sensing that a user (rider) has dismounted from a saddle of the bicycle.

Furthermore, the external device described in each of the embodiments may be a communication device outside of a vehicle that is a mobile object, and is a fixed base station or a communication device connected to the fixed base station over various networks (including telephone network), for example. It is to be noted that examples of the external device do not include a mobile device capable of mutually communicating, only through near field communication such as Bluetooth (registered trademark), with the image transmitting device mounted on the vehicle.

Moreover, all or part of each processing (processing procedures or the like shown in FIG. 5, FIG. 13, and FIG. 24) performed by the above-mentioned respective devices or the like may be executed by a mechanism (hardware) of each device or software. It is to be noted that the execution of the processing by the software is achieved by a processor included in each device or the like executing a control program stored in a memory. In addition, the control program may be recorded onto a recording medium and distributed. For instance, a distributed control program is installed into a device or the like, and the device or the like can be caused to execute each processing (processing procedures or the like shown in FIG. 5, FIG. 13, and FIG. 24) by causing a processor of the device to execute the control program.

Forms obtainable by making various modifications conceived by those skilled in the art to the above-mentioned respective embodiments or forms resulting from arbitrarily combining the structural elements and functions in the respective embodiments are included in the scope of the present invention.

INDUSTRIAL APPLICABILITY

The present invention can be applied to an image transmitting device to be mounted on a vehicle.

REFERENCE SIGNS LIST

10 Vehicle security system
11 Network
20 Server device
31, 32 Base station
50 Mobile terminal
51 User
99 Automobile
100, 100a, 100b, 200 Image transmitting device
101, 101a to 101d, 123, 501a Image capturing device
102 Storage device
103 Transmitter
104 Transmission waves
105 Detector
106 Detection waves
107 Controller
110 Cockpit
120, 120a to 120d Thermal image sensor
121, 121a to 121d Room lamp
181 Capturing unit
182 Storing unit
183 Transmitting unit
184, 284 Checking unit
185, 185a Providing unit
186 Detecting unit
187 Abnormality detecting unit
188 Sensing unit
201 Car navigation system
291 Receiving unit
292 Obtaining unit
293 Positioning unit
294 Transferring unit
502a Headlight

The invention claimed is:

1. An image transmitting device to be mounted on a vehicle, the image transmitting device comprising:
    a checking unit configured to check communicability with an external device outside of the vehicle at a parking place of the vehicle;
    a providing unit configured to provide notification information based on a result of the checking by the checking unit;
    a capturing unit configured to capture an image while the vehicle is parked; and a transmitting unit configured to transmit the image captured by the capturing unit to the external device, wherein when the result of the checking the communicability with the external device at the parking place of the vehicle shows that the communicability is denied, the providing unit is further configured to provide information indicating a parking place candidate according to neighborhood map information and communicability position information, the parking place candidate being (i) located where communicability with the external device is sufficiently high and (ii) a parking place closest to the parking place of the vehicle from among parking places affiliated with a facility and including the parking place of the vehicle.

2. The image transmitting device according to claim 1, wherein the checking unit is configured to perform the checking by measuring, at the parking place of the vehicle, reception electric field intensity of radio waves from the external device.

3. The image transmitting device according to claim 2, further comprising:

an obtaining unit configured to obtain, for each of positions, communicability position information from a server device outside of the vehicle, the communicability position information indicating communicability with the external device at the position;

a receiving unit configured to receive designation of a position of a parking place as a planned arrival place of the vehicle;

a positioning unit configured to measure a position of the vehicle; and a transferring unit configured to transfer, to the server device, the position of the parking place and the reception electric field intensity measured at the parking place by the checking unit, wherein the checking unit is configured to perform, during a period for which the vehicle has not arrived at the parking place of which the designation is received by the receiving unit, the checking for the communicability with the external device at the parking place, based on the communicability position information.

4. The image transmitting device according to claim 2, further comprising a positioning unit configured to measure a position of the vehicle, wherein the checking unit is further configured to examine communicability with the external device by measuring reception electric field intensity of radio waves from the external device, at a place other than the parking place of the vehicle, and the providing unit is further configured to provide information based on a result of the examining, when a result of the checking shows that the communicability is denied, the information indicating a position which is within a predetermined distance range from the parking place of the vehicle and where communication with the external device is possible.

5. The image transmitting device according to claim 2, further comprising:

a receiving unit configured to receive designation of a position of a parking place as a planned arrival place of the vehicle; and a positioning unit configured to measure a position of the vehicle, wherein the checking unit is further configured to examine communicability with the external device by measuring reception electric field intensity of radio waves from the external device, at a place other than the parking place of the vehicle, and the providing unit is further configured to provide information based on a result of the examining by the checking unit, when the vehicle is at a position within a predetermined distance range from the parking place as the planned arrival place, the information indicating a position where communication with the external device is possible.

6. The image transmitting device according to claim 2, wherein the checking unit is further configured to examine communicability with the external device by measuring reception electric field intensity of radio waves from the external device, at a place other than the parking place of the vehicle, and the transmitting unit is configured to avoid transmitting the image when the result of the checking shows that the communicability is denied, and subsequently transmit the image when a result of the checking or a result of the examining shows that the communicability is confirmed.

7. The image transmitting device according to claim 2, wherein the providing unit is configured to provide the notification information indicating, according to the measured reception electric field intensity, one of levels of the communicability that is the result of the checking.

8. The image transmitting device according to claim 2, further comprising a detecting unit configured to determine whether the vehicle is in a predetermined stopped state, wherein the checking unit is configured to perform the checking when the detecting unit determines that the vehicle is in the predetermined stopped state, and avoid the checking when the detecting unit determines that the vehicle is not in the predetermined stopped state.

9. The image transmitting device according to claim 2, further comprising an abnormality detecting unit configured to detect occurrence of an abnormal situation by analyzing the image captured by the capturing unit, wherein the providing unit is further configured to provide, when the abnormality detecting unit detects the occurrence of the abnormal situation, information indicating the occurrence of the abnormal situation, in the case where the result of the checking shows that the communicability is denied.

10. The image transmitting device according to claim 2, wherein the capturing unit is configured to record sequentially captured images onto a storage medium, the transmitting by the transmitting unit is transmitting a captured image recorded on the storage medium, and the providing unit is further configured to provide information indicating an amount of time that is available for the sequentially captured images to be recorded onto the storage medium, when the result of the checking shows that the communicability is denied.

11. The image transmitting device according to claim 2, wherein the capturing unit is configured to record sequentially captured images onto a storage medium, and perform the capturing or the recording according to a predetermined condition, the transmitting by the transmitting unit is transmitting a captured image recorded on the storage medium, the image transmitting device further receives an input for a scheduled parking time when the result of the checking shows that the communicability is denied, and the capturing unit is configured to set the predetermined condition to continue performing the capturing and the recording for the scheduled parking time.

12. The image transmitting device according to claim 2, further comprising
a sensing unit configured to sense that a person is approaching the vehicle,
wherein the capturing unit is configured to perform the capturing when the sensing unit continuously performs the sensing for a predetermined time or longer.

13. The image transmitting device according to claim 1, wherein the checking unit is configured to perform the checking by confirming, through communication with the external device, that the image transmitted by the transmitting unit at the parking place of the vehicle is received by the external device.

14. The image transmitting device according to claim 1, further comprising:
an obtaining unit configured to obtain, for each of positions, communicability position information from a server device outside of the vehicle, the communicability position information indicating communicability with the external device at the position; and
a receiving unit configured to receive designation of a position of a parking place as a planned arrival place of the vehicle,
wherein the checking unit is configured to perform the checking for the communicability with the external device at the parking place of which the designation is received by the receiving unit, based on the communicability position information.

15. The image transmitting device according to claim 1, wherein the providing unit is configured to perform the providing by displaying the notification information on one region of a driver display panel of the vehicle, and
the capturing unit is further configured to capture an infrared image using an infrared camera directed toward an outside of the vehicle while the vehicle is traveling.

* * * * *